United States Patent Office 3,436,390
Patented Apr. 1, 1969

3,436,390
4,4-DIHYDROXY-2-BUTENOIC ACID LACTONES
Yvon Lefebvre, Pierrefonds, Quebec, and Jean Marie Ferland, Ville St. Leonard, Quebec, Canada, assignors to American Home Products Corporation, New York, N.Y., a corporation of Delaware
No Drawing. Continuation-in-part of application Ser. No. 552,397, May 24, 1966. This application Apr. 10, 1967, Ser. No. 629,400
Int. Cl. C07c *173/00*; A61k *17/00*
U.S. Cl. 260—239.57    25 Claims

ABSTRACT OF THE DISCLOSURE

There are disclosed herein 4,4-dihydroxy-3-[3'-, 11'-, or 17'-substituted androstan- or 4'-androstan or 4'-estren- or 1',3',5'(10')-estratrien- or 1',3',5'(10'),6',8'(9')-estrapentaen-17'-yl]-2-butenoic acid lactones and their corresponding 4-acylates, as well as 21-hydroxycard-20(22)-enolides and their 21-acylates. The compounds are prepared by oxidation with a peracid of the corresponding 17-[3'-furyl]-steroid derivatives which are also disclosed herein. The compounds are useful as estrogen, implantation inhibitors, uterotrophic, antigonadatrophic, cardiotonic, anti-inflammatory, androgenic, anabolic, cholesterol lowering, and mineralocorticoid agents, and methods for their preparation and use are also given.

---

This application is a continuation-in-part of our earlier-filed U.S. patent application Ser. No. 552,397, filed May 24, 1966 now abandoned.

This invention relates to steroids which possess a 4,4-dihydroxy-2-butenoic acid lactone joined to the C-17 position of the steroid nucleus, to the intermediates used in their preparation, and to a process for preparing the compounds of this invention.

More specifically, this invention relates to novel steroids of general Formula II, in which $St$ represents a steroid radical of the estrane or androstane series and $R^1$ represents hydrogen or a lower aliphatic acyl group. These novel steroids are prepared in accordance with our invention by a process which utilizes, as starting materials, the corresponding 17-[3'-furyl]-substituted steroids of general Formula I in which $St$ has the same significance as above.

This process may be represented as follows:

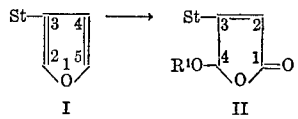

Again more specifically, this invention relates to novel steroids of the general Formula II in which the radical $St$ represents radicals of the general Formulae III and VI in which $R^2$ represents hydrogen, a lower alkyl group containing from 1–4 carbon atoms, a cycloalkyl group containing from 5–6 carbon atoms or an acyl group such as, for example the acetyl, propionyl, or butanoyl group; $R^3$ represents two atoms of hydrogen, a hydroxyl group and a hydrogen atom, or an oxygen atom; $R^4$ represents a methyl group or a hydrogen atom; $R^5$ represents a hydroxyl group or a lower aliphatic acyloxy group such as, for example, the acetoxy, propionyloxy or butanoyloxy group and a hydrogen atom or an oxygen atom; $R^6$ represents two atoms of hydrogen, a hydroxyl or a lower aliphatic acyloxy group such as, for example, the acetoxy, propionoyloxy or butanoyloxy group and one atom of hydrogen, or an oxygen atom; $R^7$ represents a hydrogen, or a lower aliphatic acyl group, such as, for example, the acetyl, propionyl or butanoyl group; X represents a hydrogen, hydroxyl or a lower aliphatic acyloxy group such as, for example, the acetoxy, propionyloxy or butanoyloxy group; and Y represents hydrogen or a hydroxyl group. The dotted lines in ring B of Formula III indicate that two double bonds in positions 6,7 and 8,9 may be present.

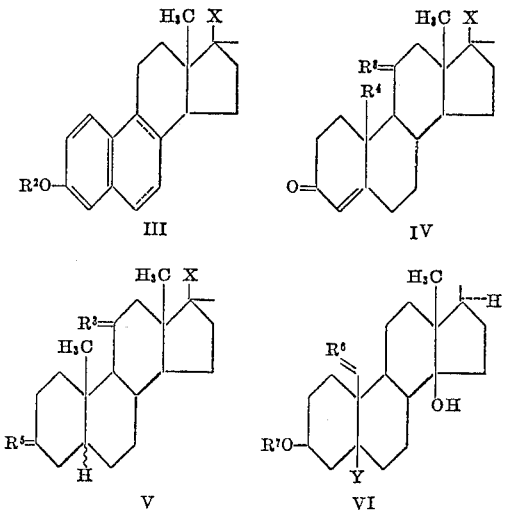

The novel products of this invention have estrogenic, implantation inhibiting, uterotropic, antigonadotropic, cardiotonic, antiinflammatory, andregenic, anabolic, cholesterol lowering, and mineralocorticoid activities. For example, the novel steroids which contain the radical III possess estrogenic, implantation inhibiting, uterotrophic and antigonadatropic activities; those which contain the radical IV possess cardiotonic, mineralocorticoid, antiinflammatory and chloresterol lowering activities; those which contain the radical V possess androgenic and anabolic activities; and those which contain the radical VI possess cardiotonic and mineralocorticoid activites. The compounds of this invention may be administered orally in the form of tablets or capsules containing 1 to 100 mg. of the active ingredients or by injection in the form of pharmaceutically acceptable sterile solutions or suspensions in oily vehicles containing from 1 to 100 mg. of the active ingredient on a daily basis or as directed by a physician.

When the starting material, or starting materials, of Formula I, as given above, contain in their steroid radical portions, elements which would render these starting materials subject to attack by the organic peracid at that steroid radical portion, it is then first necessary, in accordance with conventional principles of organic chemistry, to protect the molecule against attack at said steroid radical portion. For example, when an isolated double bond is present in the $St$ portion of the molecule it is first necessary to protect that isolated double bond against attack by the peracid utilizing protective procedures of conventional type. This is fully understood by organic chemists who are skilled in the chemistry of steroid compounds. Where the $St$ moiety of the starting material contains no isolated double bond, or double bonds, or other elements which might render it attackable by the peracid in its steroid radical portion, then no such protective measures are needed.

The starting material of general Formula I, suitably protected if necessary in its $St$ portion is preferably brought into contact with the organic peracid in the presence of a nucleophilic reagent such as acetic acid or water. Preferably approximately the same amounts of nucleophilic reagent and starting material are employed. Among organic peracids which are capable of being utilized in our process, we have obtained very good results with peracids such as peracetic acid, perbenzoic acid, monoperphthalic acid, m-chloroperbenzoic acid, and p-nitroperbenzoic acid. The organic peracid utilized may range in amount from approximtaely 1.1 molar equivalent to 100 molar equivalents, per mole of steroid starting material. Any practical solvent inert to the peracid and nucleophilic reagent may be employed. Aliphatic and cyclic ethers, such as, for example, diethyl ether, dioxan, or tetrahydrofuran; lower aliphatic ketones such as, for example, acetone or methyl ethyl ketone; aromatic hydrocarbons such as, for example benzene, toluene, or xylene; lower aliphatic alcohols, such as, for example, methanol, ethanol, isopropanol, or t-butanol; lower aliphatic acids and their lower alkyl esters such as, for example, acetic acid, ethyl acetate, or butyl acetate; and halogenated hydrocarbons such as, for example, chloroform, methylene chloride, carbon tetrachloride, or ethylene dichloride, are all useful inert solvents. The time of reaction may extend from 15 minutes to 60 hours, with the preferred range being from one half to twenty-four hours. The reaction temperature may be from 10–50° C., with the preferred range being from 20–30° C. The reaction product is isolated by washing with water or saturated sodium chloride solution, or by extraction with a water-immiscible solvent, followed by washing with bicarbonate solution, and evaporation. The crude products are purified by chromatography or crystallization.

In this manner, there are obtained the novel steroids of Formula II, in which $R^1$ represents hydrogen. Such compounds may be acylated by treatment with the appropriate lower aliphatic acid anhydrides or acid halides in the presence of a basic solvent, to obtain the corresponding acylated compounds of Formula II in which $R^1$ represents a lower aliphtaic acyl group.

More specifically, we prefer to use as starting materials for the preparation of the novel steroids of this invention certain 17-[3'-furyl] substituted steroids of general Formula I in which the radical $St$ represents radicals of the general Formulae III to VI as defined above.

The starting materials of the general Formula I, wherein the radical $St$ is represented by Formula III in which $R^2$ is as defined above and X represents a 17β-hydroxyl group, are described in U.S. Pat. No. 3,271,392.

The starting materials of the general Formula I wherein the radical $St$ is represented by Formulae IV or V in which $R^3$, $R^4$ and $R^5$ are as defined above and X represents a 17β-hydroxy group, are obtained by reacting the corresponding 17-keto derivatives VII or VIII, respectively, in which $R^3$ and $R^4$

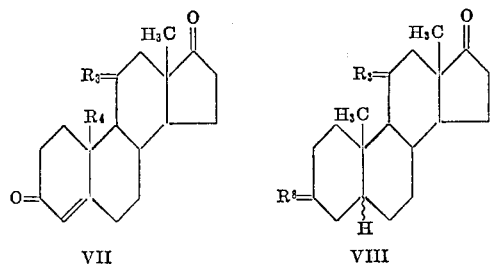

VII     VIII are as defined above and $R^8$ represents a hydroxyl group and a hydrogen atom, or an oxygen atom, with 3-furyl lithium in the manner described in U.S. Patent No. 3,271,392, viz., the 17-keto derivative is reacted with 3-furyl lithium in mixtures of ether-benzene, ether-toluene or ether-tetrahydrofuran at temperatures between room temperature and the reflux temperature of the respective mixture to yield the desired starting material, during this reaction it is essential to provide temporary protection of the 3-keto function of the 17-keto derivatives which possess this group such as, for example, 4-androstene-3,17- dione or androstane-3,11,17-trione (n.b.: An 11-keto group requires no protection during the course of this addition reaction). Such temporary protection is advantageously afforded, for example, by an ethylenedioxy group, a methyl or ethyl enol ether, or a pyrrolidinyl enamine in the case of the derivatives of Formula VII or by a dimethyl, or diethyl acetal group or an ethylenedioxy group in the case of the derivatives of Formula VIII in which $R^8$ represents oxygen. These protecting groups may be conveniently and specifically removed by subjecting the resulting products to hydrolysis under mildly acidic conditions, for example with dilute hydrochloric acid in methanol. Also during the course of this reaction it is desirable but not essential to protect the 3-hydroxy group of compounds of Formula VIII in which $R^3$ is as defined above and $R^8$ represents a hydroxyl group and a hydrogen atom in order to avoid the wasteful and useless formation of a complex between the hydroxyl and the furyllithium. Such protection is readily provided, for example, by a tetrahydropyranyl ether which subsequently can be easily and specifically removed by mild acidic conditions, for example, by dilute hydrochloric acid in methanol. Subsequently, preferential acylation of the 3-hydroxy group, if present, may be accomplished by treating the just described starting materials with the appropriate lower aliphatic acid anhydrides or acid halides in the presence of a basic solvent at room temperature. The 11-keto-17α-furyl compounds, as described above, may be reduced to the corresponding 11β-hydroxy-derivatives, preferably when the protective group in positon 3 is present.

The 17α-[3'-furyl]-substituted starting materials of general Formula I in which the $St$ radical represents radicals of the Formulae III, IV or V in which $R^2$, $R^3$, $R^4$ and $R^5$ are as defined above and X represents a 17β-hydroxy group have a threefold use.

First, they may be treated with an organic peracid as described above to yield the novel steroid of this invention of Formula II in which $R^1$ is hydrogen and the $St$ radical represents a radical of the Formulae III to V in which $R^2$, $R^3$, $R^4$ and $R^5$ have the same significance as defined above and X represents a 17β-hydroxy group.

Second, these 17α-[3'-furyl] substituted steroids of Formula I may be acylated at the tertiary hydroxyl group in position 17 by heating them with a mixture of the appropriate acid anhydride or acid chloride at 100° C. for 24 hours; under these conditions a 3-hydroxy group, if present, will also be acylated. The products of this latter treatment are then reacted with an organic peracid as described above to yield the novel steroids of this invention of Formula II in which $R^1$ is hydrogen, and in which the $St$ radical represents radicals of the Formulae III to V in which $R^2$, $R^3$, $R^4$ and $R^5$ have the same significance as above and X represents a 17β-acyloxy group such as, for example, the acetoxy, propionyloxy or the butanoyloxy group.

Finally, these 17α-[3'-furyl] substituted steroids may be converted to the starting materials of general Formula I in which the $St$ radical represents radicals of the Formulae III to VI, in which $R^2$, $R^3$, $R^4$ and $R^5$ have the same significance as described above and X represents a 17α-hydrogen. This latter conversion is schematically represented by Formulae IX→X→XI in which Q represents rings A, B and C of the steroid radicals III to V as defined above and is readily accomplished by subjecting the 17α-[3'-furyl]-substituted steroids, represented by Formula IX, such as, for example, 17α-[3'-furyl]-3-methoxy-1,3,5(10)-estratrien-17-ol, to the dehydrating action of a strong inorganic or organic acid, preferably hydrochloric acid or p-toluenesulfonic acid, in an inert solvent such as, for example, benzene, or by the dehydrating action of phosphorus oxychloride or thionyl chloride in pyridine. The resultant product of general Formula X, for example, 17 - [3' - furyl] - 3-methoxy-1,3,5(10),16- estratetraene may then be hydrogenated using palladium

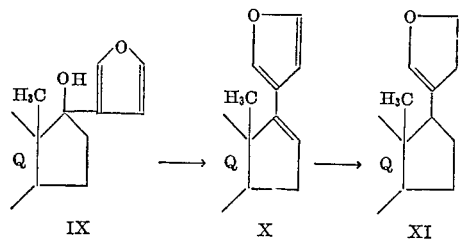

on calcium carbonate to afford the 17β-[3′-furyl]-substituted steroid of general Formula XI, for example, 17β-[3′-furyl]-3-methoxy-1,3,5(10)-estratriene. However, if the 17α-[3′-furyl]-substituted steroid IX contains a 3-ketone conjugated with a double bond at position 4,5, for example, 17α - [3′-furyl]-17-hydroxy-4-androstene-3,11-dione, it is preferable to react said steroid with ethylene glycol in the presence of a small amount of p-toluenesulfonic acid thereby obtaining the 3-ethylenedioxy group while simultaneously introducing a double bond at position 16,17 and shifting the double bond at position 4,5 to position 5,6. Subsequent preferential hydrogenation of the double bond at position 16,17 with palladium on calcium carbonate followed by mild acid treatment to remove the ethylenedioxy group affords the 17β-[3′-furyl]-substituted steroids of general Formula I in which $S_f$ represents the steroid radical of Formula IV and $R^3$ and $R^4$ have the same significance as defined above, and X represents a 17α-hydrogen, for example, 17β-[3′-furyl]-4-androstene-3,11-dione. Alternatively, the 11β-hydroxy derivatives of the latter compounds are obtained when the above 11-keto derivatives are reduced, preferably while the 3-ketone is protected. The 17β-[3′-furyl]-substituted estranes and androstanes of general Formula I in which the $S_f$ radical represents the radicals III to V in which $R^2$, $R^3$, $R^4$ and $R^5$ have the same significance as described above and X represents a 17α-hydrogen are then reacted with an organic peracid as described above to yield the novel steroids of this invention of Formula II in which $R^1$ is hydrogen and the $S_f$ radical represents a radical of Formulae III to V in which $R^2$, $R^3$, $R^4$, and $R^5$ have the same significance as above and X represents a 17α-hydrogen.

Finally the starting materials of general Formula I in which $S_f$ represents a radical of Formula VI may be prepared by the method described by Minato and Nagasaki in Chemistry and Industry, 1965, p. 899 viz., by reduction with diisobutyl aluminium hydride of the appropriate cardenolides of Formula XII

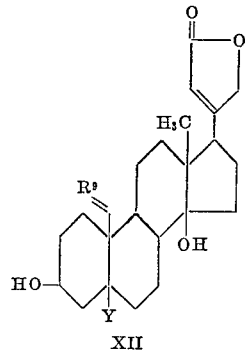

in which Y represents hydrogen or hydroxyl, $R^9$ represents two atoms of hydrogen, hydroxy and one atom of hydrogen, or an oxygen atom, to obtain the corresponding 17β-[3′-furyl]-substituted androstane derivatives of general Formula I in which $S_f$ represents a radical of the Formula VI in which $R^6$ represents represents two hydrogen atoms, hydroxyl and one atom of hydrogen, or an oxygen atom; $R^7$ represents hydrogen and Y represents a hydrogen or a hydroxy group; during the course of this reduction it is necessary to provide temporary protection of the 19-aldehyde groups, such as, for example, the aldehyde group of strophanthidin of Formula XII in which $R^9$ represents an oxygen atom and Y represents hydroxyl. Such temporary protection is advantageously afforded, for example, by the ethylenedioxy group which may be easily introduced by reacting the compound containing a reactive oxo group with ethylene glycol in the presence of a small amount of p-toluenesulfonic acid, and said protective ethylenedioxy group may be readily removed after completion of the reduction by subjecting the ethylenedioxy-substituted compound to hydrolysis with dilute hydrochloric acid in acetone solution as described by Lingner et al. in Arzneimittelforschung, vol. 13, p. 142 (1963).

These 17β-[3′-furyl]-substituted derivatives of general Formula I in which $S_f$ represents a radical of Formula VI in which $R^6$ represents two hydrogen atoms, hydroxyl and one atom of hydrogen or oxygen atom, $R^7$ represents hydrogen and Y represents hydrogen or hydroxyl, may then be acylated at position 3 by treating them with the approprate lower aliphatic acid anhydride or acyl chloride in pyridine solution. Should a 19-hydroxyl be present in the molecule, it will also be acylated under these conditions.

The 17β-[3′-furyl]-substituted androstane derivatives of Formula I in which $S_f$ represents a radical of Formula VI in which $R^6$ represents two atoms of hydrogen, hydroxyl and one atom of hydrogen, a lower aliphatic acyl group such as, for example, the acetoxy, propionyloxy or butanoyloxy group and one atom of hydrogen, or an oxygen atom; $R^7$ represents hydrogen or a lower aliphatic acyl group and Y represents hydroxyl or hydrogen, obtained as above, are then treated with an organic peracid as described above, to yield the desired steroids of this invention of Formula II in which $R^1$ represents hydrogen and $S_f$ represents a radical of Formula VI in which $R^6$, $R^7$ and Y are as defined in this paragraph.

The products of this invention of Formula II in which $R^1$ represents hydrogen and $S_f$ represents a radical of the Formulae III to VI, may then be acylated by treatment with the appropriate lower aliphatic acid anhydride or acyl halide in the presence of pyridine. In this manner the corresponding products of this invention of Formula II in which $R^1$ represents a lower aliphatic acyl group such as, for example, the acetyl, propionyl or butanoyl group, is obtained. Should a 3-hydroxy or a 19-hydroxy group or both be present in the molecule, it or they will be acylated under these conditions.

The following examples will illustrate the scope of this invention.

EXAMPLE 1

A solution of 17α-[3′-furyl]-3-methoxy-1,3,5(10)-estratrien-17-ol (728 mg.) described in U.S. Patent No. 3,271,392, pyridine (14.5 ml.), and phosphorus oxychloride (1.45 ml.), is heated on a steam bath for 1 hour. The mixture is poured in ice-water and extracted with ether. The ether solution is washed with dilute sulfuric acid, sodium bicarbonate and water, dried and evaporated to dryness. The residue is discolored by treatment on activated charcoal and crystallized from methylene chloride - ether to give 17 - [3′ - furyl] - 3 - methoxy-1,3,5(10),16-estratetraene M.P. 162.5–164° C.

Similarly dehydration of 17α-[3′-furyl]-1,3,5(10)-estratriene-3,17-diol, also described in U.S. Patent No. 3,271,392, yields 17-[3′-furyl]-1,3,5(10),16-estratetraen-3-ol.

By a similar procedure the 3-ethyl, 3-propyl, 3-isopropyl, 3-n-butyl, 3-sec.-butyl, 3-cyclopentyl and 3-cyclohexyl ethers of 17α-[3′-furyl]-1,3,5(10)-estratriene-3,17-diol, also described in U.S. Patent No. 3,271,392, are dehydrated to yield the corresponding 3-alkoxy- or 3 - cycloalkoxy - 17 - [3′ - furyl] - 1,3,5,(10),16 - estratetraenes, such as, 3 - ethoxy - 17 - [3′ - furyl] - 1,3,5(10), 16 - estratetraene, 17 - [3′ - furyl] - 3 - propoxy - 1,3,-

5(10),16 - estratetranene, 17 - [3' - furyl] - 3 - isopropoxy - 1,3,5(10),16 - estratetraene, 3 - n - butoxy - 17-[3' - furyl] - 1,3,5(10),16 - estratetraene, 3 - sec. - butoxy-17 - [3' - furyl] - 1,3,5(10),16 - estratetraene, 3 - cyclopentyloxy - 17 - [3' - furyl] - 1,3,5(10),16 - estratetraene, and 3 - cyclohexyloxy - 17 - [3' - furyl] - 1,3,5(10)16 - estratetraene.

Similarly dehydration of the 3 - acyloxy - 17α - [3'-furyl] - 1,3,5(10) - estratrien - 17 - ol, also described in U.S. Patent No. 3,271,392, yields the corresponding 3-acyloxy - 17 - [3' - furyl] - 1,3,5(10),16 - estratetraenes, such as, for example, 3 - acetoxy - 17 - [3' - furyl]-1,-3,5(10),16 - estratetranen, 17 - [3' - furyl] - 3-propionyloxy - 1,3,5(10),16 - estratetraene, 3 - butanoyloxy - 17 - [3' - furyl] - 1,3,5,(10),16 - estratetraene.

EXAMPLE 2

A mixture of 17 - [3'-furyl]-3-methoxy-1,3,5(10),16-estratetraene (5.5 g.), obtained in Example 1, prehydrogenated 5% palladium on calcium carbonate (5.5 g.), and ethyl acetate (559 ml.), is hydrogenated for 2½ minutes. The catalyst is filtered and the filtrate is evaporated to dryness. The residue is chromatographed on alumina. The fractions eluted with mixtures of benzene and hexane are combined and crystallized from methylene chloride-hexane to give 17β-[3'-furyl]-3-methoxy-1,3,5 (10)-estratriene M.P. 147–149° C.

Similarly hydrogenation of 17-[3'-furyl]-1,3,5(10),16-estratetraen-3-ol yields 17β - [3' - furyl]-1,3,5(10)-estratrien-3-ol.

By a similar procedure the other 3-alkoxy-17-[3'-furyl]-1,3,5(10),16 - estratetraenes and 3 - cycloalkoxy-17-[3'-furyl]-1,3,5(10),16-estratetraenes, obtained in Example 1, are hydrogenated to give the corresponding 3-alkoxy-and 3-cycloalkoxy-17β-[3'-furyl]-1,3,5(10)-estratrienes, such as, for example, 3-ethoxy-17β-[3'-furyl]-1,3,5(10)-estratriene, 17β - [3' - furyl]-3-propoxy - 1,3,5(10)-estratriene, 3 - n - butoxy-17β-[3'-furyl]-1,3,5(10)-estratriene, 3-sec.-butoxy-17β-[3' - furyl] - 1,3,5(10) - estratriene, 3-cyclopentyloxy - 17β-[3'-furyl]-1,3,5(10)-estratriene and 3-cyclohexyloxy-17β-[3'-furyl]-1,3,5(10)-estratriene.

Similarly the hydrogenation of the 3-acyloxy-17-[3'-furyl]-1,3,5(10),16-estratetraenes, described in Example 1, gives the corresponding 3-acyloxy-17β-[3'-furyl]-1,3,5 (10)-estratrienes such as, for example, 3-acetoxy-17β-[3'-furyl]-1,3,5(10)-estratriene, 17β - [3'-furyl]-3-propionyloxy - 1,3,5(10) - estratriene and 3 - butanoyloxy-17β-[3'-furyl]-1,3,5(10)-estratriene.

EXAMPLE 3

A mixture of 3-iodofuran (6.6 g.), ether (182 ml.), and a 0.95 N ethereal solution of n-butyllithium (38.4 ml.), is stirred at −60° C. for 30 minutes. A solution of 3-ethoxy-3,5-androstadien-17-one (6.5 g.), prepared as described in J. Org. Chem. vol. 29, 601 (1964), in toluene (260 ml.), is added and the mixture is stirred at room temperature for 16 hours. Ether and water are added. The organic phase is separated and further washed with water to neutrality. After drying and evaporating the solvents, 3 - ethoxy-17α-[3'-furyl]-3,5-androstadien-17-ol is obtained. A solution of this compound (7.7 g.) in 95% ethanol (320 ml.), and water (53 ml.), is stirred for 16 hours at room temperature with 0.1 N solution of hydrochloric acid (107 ml.). Water is added and the mixture extracted with ether. The ether solution is washed with sodium bicarbonate and water, dried and evaporated to dryness. The residue is chromatographed on alumina. The fractions eluted with benzene-hexane and benzene are combined and crystallized from 95% ethanol to yield 17α-[3'-furyl]-17-hydroxy-4-androsten-3-one M.P. 209–211° C.

By a similar procedure, 3-ethoxy-3,5-androstadiene-11,17-dione, 3-ethoxy-3,5-estradien-17-one, and 3-ethoxy-3,5-estradiene-11,17-dione, prepared respectively from 4-androstene-3,11,17-trione, 4-estrene - 3,17 - dione and 4-estrene-3,11,17-trione, according to the method described in J. Org. Chem. vol. 29, 601 (1964), yield upon treatment with 3-furyllithium 3-ethoxy-17α-[3'-furyl]-17-hydroxy-3,5-androstadien-11-one, 3 - ethoxy-17α-[3'-furyl]-3,5-estradien - 17 - ol and 3-ethoxy-17α-[3'-furyl]-17-hydroxy-3,5-estradien-11-one. The later compounds in turn give 17α - [3'-furyl]-17-hydroxy-4-androstene-3,11-dione, 17α-[3'-furyl]-17-hydroxy-4-estren - 3 - one, and 17α-[3'-furyl]-17-hydroxy-4-estrene - 3,11 - dione upon mild acid hydrolysis.

EXAMPLE 4

Pyrrolidine (42 ml.) is added dropwise to a boiling solution of 4-androstene-3,17-dione (42 g.), in methanol (1008 ml.). After cooling at 0° C. for 1 hour the resulting 3-[1'-pyrrolidinyl] - 3,5 - androstadien-17-one is filtered, thoroughly washed with methanol and dried.

A solution of 3-iodofuran (47.5 g.), in ether (950 ml.), and a 1.60 N ethereal solution of n-butyllithium (134 ml.), is stirred for 30 minutes at −60° C. Then a solution of 3-[1'-pyrrolidinyl]-3,5-androstadien-17-one (47.5 g.), obtained above, in toluene (1900 ml.), is added. The mixture is stirred for 16 hours at room temperature and the reaction product is isolated as previously indicated in Example 3 to yield 17α-[3'-furyl]-3-[1'-pyrrolidinyl]-3,5-androstadien-17-ol. A solution of this latter compound (62 g.), methanol (805 ml.), acetic acid (124 ml.), sodium acetate (186 g.) and water (186 ml.) is refluxed for 4 hours. The mixture is poured in ice-water and is extracted with ether. The ether solution is washed with water, sodium bicarbonate and water again, dried and evaporated. The residue is chromatographed on alumina. The fractions eluted with benzene and mixtures of benzene-ether are combined and crystallized from 95% ethanol yielding 17α-[3'-furyl]-17-hydroxy-4-androsten-3-one M.P. 207–208° C., identical in all respects with the compound obtained in Example 3.

EXAMPLE 5

Pyrrolidine (4 ml.) is added to a boiling solution of 4-estrene-3,17-dione (10 g.), described in J. Org. Chem. 25, 2248 (1960), in methanol (40 ml.). After cooling, the precipitate is filtered, well washed with methanol and dried to yield 3-[1'-pyrrolidinyl]-3,5-estradien-17-one.

A solution of 3-iodofuran (6.74 g.), ether (135 ml.) and a 1.42 N ethereal solution of n-butyllithium is stirred for 30 minutes at −60° C. A solution of 3-[1'-pyrrolidinyl]-3,5-estradien-17-one (6.74 g.), obtained above, in toluene (270 ml.) is added and the reaction mixture is left at room temperature for 16 hours. The reaction is worked up as in Example 3 to yield 17α-[3'-furyl]-[1'-pyrrolidinyl]-3,5-estradien-17-one. The latter compound is hydrolyzed as in Example 4. The residue is chromatographed on alumina. The fractions eluted with benzene and mixtures of benzene and ethyl acetate are combined and crystallized from ethyl acetate to give 17α-[3'-furyl]-17-hydroxy-4-estren-3-one M.P. 158–159° C.

By a similar procedure 3-[1'-pyrrolidinyl]-3,5-estrene-11,17-dione, prepared as above from 4-estrene-3,11,17-trione, described in J. Am. Chem. Soc. 78, 1512 (1956), yields 17α-[3'-furyl] - 17 - hydroxy - 3 - [1'-pyrrolidinyl]-3,5-estradien-11-one, which upon hydrolysis gives 17α-[3'-furyl]-17-hydroxy-4-estren-3,11-dione.

EXAMPLE 6

Pyrrolidine (60 ml.) is added dropwise to a boiling solution of 4-androstene-3,11,17-trione (60 g.), in methanol (1440 ml.). The mixture is cooled in an ice-bath for 1 hour. The resulting solid is filtered, well washed with methanol and dried yielding 3-[1'-pyrrolidinyl]-3,5-androstadiene-11,17-dione.

A solution of iodofuran (66 g.), in ether (1320 ml.), and an ethereal solution (1.59 N) of n-butyllithium (188 ml.), is stirred at −60° C. for 30 minutes. A solution of the above enamine (66 g.) in toluene (2640 ml.) is added and the reaction is allowed to proceed at room temperature for 16 hours. The reaction is worked up as in Example 3, to yield 17α-[3'-furyl]-17-hydroxy-3-[1'-pyrrolidinyl]-3,5-androstadien-11-one. This latter compound (79 g.) is hydrolyzed as in Example 4. The crude reaction product is crystallized from ethanol and then dioxan to give 17α-[3'-furyl]-17-hydroxy-4-androstene-3, 11-dione M.P. 251–254° C.

EXAMPLE 7

A mixture of 11α,17β-diacetoxy-4-androsten-3-one (29.7 g.), described in J. Org. Chem. 18, 1166 (1953), benzene (1487 ml.), ethylene glycol (148.7 ml.), and p-toluenesulfonic acid (2.97 g.) is refluxed and stirred for 20 hours in a flask equipped with a continuous water separator. After cooling, the solution is washed with sodium bicarbonate and water, dried and evaporated to yield 11α,17β-diacetoxy-3,3-ethylene-dioxy-5-androstene, purified by crystallization with methylene chloride-methanol (with a small amount of pyridine) M.P. 188–189° C.

A mixutre of the above compound (21.5 g.), sodium hydroxide (5.4 g.), methanol (900 ml.), and water (86 ml.) is refluxed for 20 hours. The solvent is partially evaporated. Water is added and the precipitate is filtered washed and dried, yielding 3,3-ethylenedioxy-5-androstene-11α,17β-diol.

By a similar procedure 11α,17β-diacetoxy-4-estren-3-one described in J. Am. Chem. Soc. 78, 1512 (1956), yields a mixture of 11α,17β-diacetoxy-3,3-ethylenedioxy-5-estrene and 11α,17β-diacetoxy-3,3-ethylenedioxy-5(10)-estrene, which upon alkaline hydrolysis gives a mixture of 3,3-ethylenedioxy-5-estrene-11α,17β-diol and 3,3-ethylenedioxy-5(10)-estrene-11α,17β-diol.

Similarly 17β-hydroxy-4-androsten-3-one and 17β-hydroxy-4-estren-3-one are treated with ethylene glycol and p-toluene-sulfonic acid in benzene to yield respectively, 3,3-ethylenedioxy-5-androsten-17β-ol, and a mixture of 3,3-ethylenedioxy-5-estren-17β-ol and 3,3-ethylenedioxy-5(10)-estren-17β-ol.

EXAMPLE 8

Chromium trioxide (17.2 g.) is cautiously added to dry pyridine cooled at −20° C. To this complex a solution of 3,3-ethylenedioxy-5-androsten-11α,17β-diol (17.2 g.) obtained in Example 7 in pyridine (172 ml.), is added dropwise. The mixture is stirred for 32 hours at room temperature. The mixture is filtered on Celite, and the filtrate is diluted with water, and extracted with ether. The ether is washed wih dilute sulfuric acid, sodium bicarbonate and water, dried and evaporated yielding, 3,3-ethylenedioxy-5-androstene-11,17-dione, purified by crystallization with methanol (containing small amounts of pyridine) M.P. 208–210° C.

Similarly oxidation of the mixture of 3,3-ethylenedioxy-5-estrene-11α,17β-diol and 3,3-ethylenedioxy-5(10)-estrene-11α,17β-diol obtained in Example 7 yields a mixture of 3,3-ethylene-dioxy-5-estrene-11,17-dione and 3,3-ethylenedioxy-5(10)-estrene-11,17-dione.

Similarly oxidation with chromium trioxide/pyridine complex in pyridine solutions of 3,3-ethylenedioxy-5-androsten-17β-ol and a mixture of 3,3-ethylenedioxy-5-estren-17β-ol and 3,3-ethylenedioxy-5(10)-estren-17β-ol obtained as described in Example 7, yields respectively 3,3-ethylenedioxy-5-androsten-17-one and a mixture of 3, 3-ethylenedioxy-5-estren-17-one and 3,3-ethylenedioxy-5(10)-estren-17-one.

EXAMPLE 9

A solution of 3-iodofuran (12 g.), ether (240 ml.), and a 1.5 N ethereal solution of n-butyllithium is stirred for 30 minutes at −60° C. A solution of 3,3-ethylenedioxy-5-androstene-11,17-dione (13.1 g.), prepared in Example 8, in toluene (480 ml.) is added and the mixture is stirred at room temperature for 16 hours. The reaction is worked up as in Example 3, yielding 3,3-ethylenedioxy-17α-[3'-furyl]-17-hydroxy-5-androsten-11-one purified by crystallization with methylene chloride-methanol (with small quantities of pyridine) M.P. 250–253° C.

By a similar procedure a mixture of 3,3-ethylenedioxy-5-estrene-11,17-dione, and 3,3-ethylenedioxy-5(10)-estrene-11,17-dione obtained in Example 8, is transformed into a mixture of 3,3-ethylenedioxy-17α-[3'-furyl]-17-hydroxy-5-estren-11-one and 3,3-ethylenedioxy-17α-[3'-furyl]-17-hydroxy-5(10)-estren-11-one, when treated with 3-furyllithium.

Similarly reaction with 3-furyllithium of 3,3-ethylenedioxy-5-androsten-17-one, and a mixture of 3,3-ethylenedioxy-5-estren-17-one and 3,3-ethylenedioxy-5(10)-estren-17-one obtained in Example 8, yields respectively 3,3-ethylenedioxy-17α-[3'-furyl]-5-androsten-17-ol, and a mixture of 3,3-ethylenedioxy-17α-[3'-furyl]-5-estren-17-ol and 3,3-ethylenedioxy-17α-[3'-furyl]-5(10)-estren-17-ol.

EXAMPLE 10

A solution of 3,3-ethylenedioxy-17α-[3'-furyl]-17-hydroxy-5-androsten-11-one (9.9 g.), described in Example 9, in dry tetrahydrofuran (198 ml.), is added dropwise to a mixture of lithium aluminum hydride (4.95 g.) and tetrahydrofuran (297 ml.). The mixture is refluxed for 4 hours. To the cold mixture ethyl acetate (40 ml.) is added, followed by a saturated sodium chloride solution (60 ml.). The inorganic salts are filtered and washed with tetrahydrofuran. The filtrate is evaporated and the residue is dissolved in a mixture of methylene chloride-ether. The organic solution is washed with a saturated solution of ammonium chloride and water dried and evaporated yielding 3,3-ethylene-dioxy-17α-[3'-furyl]-5-androstene-11β,17-diol, purified by crystallization with methanol-ether M.P. 197–199° C.

By a similar procedure reduction with lithium aluminium hydride of a mixture of 3,3-ethylenedioxy-17α-[3'-furyl]-17-hydroxy-5-estren-11-one, and 3,3-ethylenedioxy-17α-[3'-furyl]-17-hydroxy-5(10)-estren-11-one obtained in Example 9, yields a mixture of 3,3-ethylenedioxy-17α-[3'-furyl]-5-estrene-11β,17-diol and 3,3-ethylenedioxy-17α-[3'-furyl]-5(10)-estrene-11β,17-diol.

EXAMPLE 11

A solution of 3,3-ethylenedioxy-17α-[3'-furyl]-5-androstene-11β,17-diol (7.9 g.), obtained in Example 10, 95% ethanol (316 ml.), water (36.4 ml.), and a 1 N solution of hydrochloric acid (104 ml.) is stirred at room temperature for 4 hours. The reaction mixture is made alkaline by the addition of sodium bicarbonate, and the solvent is evaporated to dryness. The residue is taken up in ether and water. The ether solution is further washed with water, dried and evaporated. The residue is chromatographed on silica gel. The fractions eluted with mixtures of ethyl acetate-benzene are combined and crystallized from methanol-ether to give 11β,17β-dihydroxy-17-[3'-furyl]-4-androsten-3-one M.P. 198–200° C.

By a similar procedure the 3-ketal of a mixture of 3,3-ethylenedioxy - 17α-[3'-furyl]-5-estrene-11β,17-diol and 3,3 - ethylenedioxy-17α-[3'-furyl]-5(10)-estrene - 11β,17-diol, described in Example 10, is hydrolyzed to yield 11β, 17β-dihydroxy-17-[3'-furyl]-4-estren-3-one.

By a similar hydrolysis procedure 3,3-ethylenedioxy-17α-[3'-furyl]-5-androsten-17-ol, and a mixture of 3,3-ethylenedioxy-17α-[3'-furyl]-5-extren-17-ol and 3,3-ethylenedioxy-17α-[3'-furyl]-5(10)-estren-17-ol obtained in Example 9 are respectively transformed into 17α-[3'-furyl]-17-hydroxy-4-androsten-3-one and 17α-[3'-furyl]-17-hydroxy-4-estren-3-one.

Similarly hydrolysis of the 3,3-ethylenedioxy group in 3,3 - ethylenedioxy - 17α - [3' - furyl] - 17 - hydroxy-5-androsten-11-one and a mixture of 3,3-ethylenedioxy-17α-[3'-furyl]-5-estren-11-one and 3,3-ethylenedioxy-17α-[3'-furyl]-17-hydroxy-5(10)-estren-11 - one described in Example 9 yields respectively 17α-[3'-furyl]-17-hydroxy-4-androstene-3,11-dione and 17α - [3'-furyl]-17-hydroxy-4-estrene-3,11-dione.

EXAMPLE 12

By a similar procedure as described in Example 10, 3-ethoxy - 17α - [3' - furyl] - 17 - hydroxy - 3,5 - androstadien-11-one, and 3-ethoxy-17α-[3'-furyl]17-hydroxy-3,5-estradien-11-one obtained in Example 3 are reduced by lithium aluminium hydride in tetrahydrofuran solutions to yield respectively 3-ethoxy-17α-[3'-furyl]-3,5-androstadiene-11β,17-diol and 3-ethoxy-17α-[3'-furyl]-3,5-estradiene-11β,17-diol.

Removal of the protecting group in the latter two compounds, according to the method given in Example 3, yields respectively 11β,17β-dihydroxy-17 - [3' - furyl] - 4-androsten-3-one and 11β,17β-dihydroxy-17-[3'-furyl]-4-estren-3-one.

EXAMPLE 13

By a similar procedure as described in Example 10, reduction with lithium aluminum hydride of 17α-[3'-furyl]-17-hydroxy-3-[1' - pyrrolidinyl] - 3,5-estradien-11-one, obtained in Example 5, and 17α-[3'-furyl]-17-hydroxy-3-[1'-pyrrolidinyl]-3,5 - androstadien-11-one, obtained in Example 6, yields respectively 17α-[3'-furyl]-3-[1'-pyrrolidinyl]-3,5-estradiene-11β,17-diol and 17α-[3'-furyl]-3-[1'-pyrrolidinyl]-3,5 - androstadiene-11β,17-diol.

Removal of the 3-enamine protecting group in the latter two compounds by the method of Example 4 yields respectively 11β,17β-dihydroxy - 17-[3'-furyl]-4-estren-3-one and 11β,17β-dihydroxy-17-[3'-furyl]-4-androsten-3-one.

EXAMPLE 14

In a three-neck flask, equipped with a stirrer and a water separator, a solution of 17α-[3'-furyl]-17-hydroxy-4-androsten-3-one (25 g.), described in Example 3, benzene (1250 ml.), ethylene glycol (125 ml.), and p-toluenesulfonic acid (2.5 g.) is refluxed and stirred for 20 hours. The cold solution is washed with bicarbonate and water, dried and evaporated, yielding 3,3-ethylenedioxy-17-[3'-furyl]5,16-androstadiene, purified by crystallization from methylene chloride-methanol, containing a small quantity of pyridine, M.P. 228–231° C.

Similarly ketalization of 17α-[3'-furyl]-17-hydroxy-4-estren-3-one, obtained in Example 5, yields a mixture of 3,3-ethylenedioxy-17-[3'-furyl]-5,16-estradiene and 3,3-ethylenedioxy-17-[3'-furyl]-5,(10),16-estradiene.

EXAMPLE 15

A mixture of 17α-[3'-furyl]-17-hydroxy-4-androstene-3,11-dione (1 g.), obtained in Example 6, benzene (50 ml.), ethylene glycol (5 ml.), and p-toluenesulfonic acid (100 mg.), is refluxed and stirred for 20 hours in a flask equipped with a continuous water separator. The reaction is worked up as in Example 14, yielding 3,3-ethylenedioxy-17-[3'-furyl] - 5,16 - androstadien-11-one, purified by crystallization with methylene chloride-methanol (with pyridine) M.P. 205–207° C.

Similarly ketalization of 17α-[3'-furyl]-17-hydroxy-4-estrene-3,11-dione, obtained in Example 5 yields a mixture of 3,3-ethylenedioxy-17-[3'-furyl]-5,16-estradien-11-one and 3,3-ethylenedioxy-17-[3'-furyl]-5(10),16-estradien-11-one.

EXAMPLE 16

A mixture of 3,3-ethylenedioxy-17-[3'-furyl]-5,16-androstadien-11-one (500 mg.), obtained in Example 15, ethyl acetate (23.5 ml.) and prehydrogenated 5% pallidium on calcium carbonate (125 mg.) is hydrogenated at room temperature and at normal pressure for 5 minutes. The catalyst is filtered and the filtrate is evaporated to dryness yielding 3,3-ethylenedioxy-17β-[3'-furyl]-5-androsten-11-one, purified by crystallization from acetone-hexane M.P. 176–178° C.

By a similar procedure hydrogenation of 3,3-ethylenedioxy-17-[3'-furyl]-5,16-androstadiene, obtained in Example 14, the mixture of 3,3-ethylenedioxy-17-[3'-furyl]-5,16-estradiene and 3,3-ethylenedioxy - 17-[3'-furyl]-5 (10),16-estradiene, obtained in Example 14, and the mixture of 3,3-ethylenedioxy-17-[3'-furyl]-5,16-estradien-11-one, and 3,3-ethylenedioxy-17-[3'-furyl]-5(10),16-estradien-11-one obtained in Example 15, yields respectively 3,3-ethylenedioxy-17β-[3'-furyl]-5-androstene M.P. 186–188° C., a mixture of 3,3-ethylenedioxy-17β-[3'-furyl]-5-estrene and 3,3-ethylenedioxy - 17β-[3'-furyl]-5(10)-estrene, and a mixture of 3,3-ethylenedioxy-17β-[3'-furyl]-5-estren-11-one and 3,3-ethylenedioxy - 17β-[3'-furyl]-5(10)-estren-11-one.

EXAMPLE 17

A solution of 3,3-ethylenedioxy-17β-[3'-furyl]-5-androsten-11-one (4.8 g.), obtained in Example 16, in dry tetrahydrofuran (96 ml.), is added dropwise to a stirred mixture of lithium aluminum hydride (2.4 g.) in tetrahydrofuran (144 ml.). The mixture is refluxed for 4 hours. The reaction product is isolated as indicated in Example 10. Crystallization of the crude product from acetone-methanol yields 3,3-ethylenedioxy-17β-[3'-furyl]-5-androsten-11β-ol, M.P. 185–187° C.

Similarly reduction with lithium aluminium hydride of the mixture of 3,3-ethylenedioxy-17β-[3'-furyl]-5-estren-11-one and 3,3-ethylenedioxy - 17β-[3'-furyl]-5(10)-estren-11-one, obtained in Example 16, yields a mixture of 3,3-ethylenedioxy-17β-[3'-furyl]-5-estren-11β-ol and 3,3-ethylenedioxy-17β-[3'-furyl]-5(10)-estren-11β-ol.

EXAMPLE 18

A mixture of 3,3-ethylenedioxy-17β-[3'-furyl]-5-androsten-11β-ol (2.1 g.), obtained in Example 17, acetone (88 ml.), and p-toluenesulfonic acid (210 mg.), is refluxed for 1 hour. Water is added and the mixture is extracted with ether. The ether is washed with sodium bicarbonate and water, dried and evaporated, leaving 17β-[3'-furyl]-11β-hydroxy-4 - androsten-3-one, purified by crystallization from 2-methoxyethanol and then acetone M.P. 207–209° C.

Similarly hydrolysis of the 3,3-ethylenedioxy group in the mixture of 3,3-ethylenedioxy-17β-[3'-furyl]-5-estren-11β-ol, and 3,3-ethylenedioxy - 17β-[3'-furyl]-5(10)-estren-10β-ol described in Example 17 yields 17β-[3'-furyl]-11β-hydroxy-4-estren-3-one.

EXAMPLE 19

A mixture of 3,3-ethylenedioxy-17β-[3'-furyl]-5-androstene (18.8 g.), obtained in Example 16, acetone (780 ml.), and p-toluenesulfonic acid (1.88 g.) is refluxed for 1 hour. The reaction is worked up as in Example 18, yielding 17β-[3'-furyl]-4-androsten-3-one, purified by crystallization from methanol M.P. 187–188°.

Similarly hydrolysis of the 3,3-ethylenedioxy group in the mixture of 3,3-ethylenedioxy-17β-[3'-furyl]-5-estrene and 3,3-ethylenedioxy-17β-[3'-furyl]-5(10)-estrene described in Example 16, yields 17β-[3'-furyl]-4-estren-3-one.

EXAMPLE 20

A mixture of 3,3-ethylenedioxy-17β-[3'-furyl]-5-androsten-11-one (6.25 g.), described in Example 16, acetone (250 ml.), and p-toluenesulfonic acid (637 mg.), is refluxed for 1 hour. The solution is diluted with water and ether. The ether layer is separated, washed with sodium bicarbonate and water, dried and evaporated yielding 17β-[3'furyl]-4-androstene-3,11-dione, recrystallized from acetone-hexane M.P. 189–190° C.

By a similar procedure hydrolysis of the ketal group in the mixture 3,3-ethylenedioxy-17β-[3'-furyl]-5-estren-11-one and 3,3-ethylenedioxy-17β-[3'-furyl]-5(10)-estren-11-one, obtained in Example 16, yields 17β - [3' - furyl] - 4-estrene-3,11-dione.

EXAMPLE 21

A mixture of 17α-[3'-furyl]-17-hydroxy-4-androsten-3-one (1 g.), obtained in Example 3, methylene chloride (15 ml.), ether (15 ml.), and a 25% hydrochloric acid solution (8 ml.), is stirred at room temperature for 18 hours. The water phase is separated and the organic solution is washed with sodium bicarbonate and water, dried and evaporated. The residue is crystallized from methanol to yield 17 - [3' - furyl] - 4,16 - androstadien - 3-one M.P. 124–126° C.

By a similar procedure 17α-[3'-furyl]-17-hydroxy-4-estrene-3-one, and 17α-[3'-furyl]-17-hydroxy-4-estrene-3,11-dione, obtained in Example 5, and 17α-[3'-furyl]-17-hydroxy-4-androstene-3,11-dione, obtained in Example 6 are respectively transformed by acid dehydration to 17-[3' - furyl] - 4,16 - estradien - 3 - one, 17-[3'-furyl]-4,16-estradiene - 3,11 - dione and 17-[3'-furyl]-4,16-androstadiene-3,11-dione.

EXAMPLE 22

A mixture of 17 - [3' - furyl] - 4,16-androstadien-3-one (7.76 g.), obtained in Example 21, ethyl acetate (360 ml.), and prehydrogenated 5% palladium on calcium carbonate (1.95 g.) is hydrogenated for 5 minutes. The catalyst is filtered and the filtrate evaporated to dryness, yielding 17β - [3' - furyl] - 4-androsten-3-one, purified by crystallization from methanol M.P. 186–188° C.

Similarly hydrogenation of 17 - [3' - furyl]-4,16-estradien-3-one, 17 - [3'-furyl]-4,16-estradiene-3,11-dione and 17 - [3'-furyl]-4,16-androstadiene-3,11-dione, obtained in Example 21, yields respectively 17β-[3'-furyl]-4-estren-3-one, 17β - [3' - furyl] - 4-estrene-3,11-dione and 17β-[3'-furyl]-4-androstene-3,11-dione.

EXAMPLE 23

A solution of 5α-androstane-3,17-dione (1 g.), oxalic acid (500 mg.), and methanol (15 ml.), is left at room temperature for 90 minutes. After cooling the solution to 0° C. the acid is neutralized by the addition of a cold solution of sodium bicarbonate. The mixture is extracted with ether. The ether is washed with water, dried and evaporated yielding 3,3-dimethoxy-5α-androstan-17-one, purified by crystallization with hexane (containing a few drops of pyridine) M.P. 122–125° C.

By a similar procedure 5β-androstane-3,17-dione, described in J. Org. Chem., 25, 1399 (1960), 5α-androstane, 3,11,17-trione, described in Helv. Chem. Acta, 36, 652 (1953), and 5β-androstane-3,11,17-trione, described in Helv. Chem. Acta, 36, 1266 (1953), are transformed in the corresponding 3,3 - dimethoxy - 5β-androstan-17-one, 3,3 - dimethoxy - 5α-androstane-11,17-dione, and 3,3-dimethoxy-5β-androstane-11,17-dione.

A solution of 3-iodofuran (21.4 g.), ether (35 ml.), and a 1.1 N ethereal solution of n-butyllithium (88.9 ml.), is stirred at —60° C. for 30 minutes. A solution of 3,3-dimethoxy-5α-androstan-17-one (21.3 g.), described above, in toluene (500 ml.), is added and the mixture is stirred at room temperature for 16 hours. The reaction is worked up as in Example 3, to give 3,3-dimethoxy-17α-[3'-furyl]-5α-androstan-17-ol. A solution of the latter compound and oxalic acid (15 g.) in acetone (500 ml.), and water (50 ml.), is stirred for 3 hours at room temperature. Addition of water gives 17α-[3'-furyl]-17-hydroxy-5α-androstan-3-one M.P. 236–238° C., crystallized from methylene chloride-hexane.

Similarly, 3,3 - dimethoxy-5β-androstan-17-one, 3,3-dimethoxy - 5α-androstane-11,17-dione and 3,3-dimethoxy-5β-androstane-11,17-dione, described above, are treated with 3-furyllithium to give 3,3-dimethoxy-17α-[3'-furyl]-5β - androstan-17-ol, 3,3-dimethoxy-17α-[3'-furyl]-17-hydroxy - 5α-androstan-11-one, and 3,3-dimethoxy-17α-[3'-furyl]-17-hydroxy-5β-androstan-11-one, respectively.

Hydrolysis of the dimethoxy group in the above compounds yields respectively, 17α-[3'-furyl]-17-hydroxy-5β-androstan - 3 - one, 17α-[3'-furyl]-17-hydroxy-5α-androstane - 3,11 - dione, and 17α-[3'-furyl]-17-hydroxy-5β-androstan-3,11-dione.

EXAMPLE 24

Treatment of 3,3-ethylenedioxy-5α-androstan-17-one, described in Bull. Soc. Chim. Fr., p. 68 (1965), with 3-furyllithium as in Example 3, yields 3,3-ethylenedioxy-17α-[3'-furyl]-5α-androstan-17-ol, which upon hydrolysis as described in Example 11, is transformed into 17α-[3'-furyl]-17-hydroxy-5α-androstan-3-one.

Similarly 3,3-ethylenedioxy-5β-androstan-17-one, prepared from 17β-hydroxy-5β-androstan-3-one, according to the method described in Bull. Soc. Chim. Fr., p. 68 (1965), yields 3,3-ethylenedioxy-17α[3'-furyl]-5β-androstan-17-ol, which upon mild acid hydrolysis gives 17α-[3'-furyl]-17-hydroxy-5β-androstan-3-one.

In a similar manner 3,3-ethylenedioxy-5β-androstane-11,17-dione, prepared according to the method of Example 8 from 11α,17β-dihydroxy-5β-androstan-3-one, described in U.S. Patent 2,877,162, yields 3,3-ethylenedioxy - 17 α- [3'-furyl]-17-hydroxy-5β-androstan-11-one, transformed by acid hydrolysis to 17α-[3'-furyl]-17-hydroxy-5β-androstane-3,11-dione.

EXAMPLE 25

Reduction with lithium aluminum hydride as described in Example 10, of 3,3-dimethoxy-17α-[3'-furyl]-17-hydroxy-5α-androstan-11-one, and 3,3-dimethoxy-17α-[3'-furyl]-17-hydroxy-5β-androstan-11-one, obtained in Example 23, yields respectively 3,3-dimethoxy-17α-[3'-furyl] 5α-androstane - 11β,17-diol, and 3,3-dimethoxy-17α-[3'-furyl]-5β-androstane-11β,17-diol. Hydrolysis of the protecting 3,3-dimethoxy group as described in Example 23, gives 11β,17β-dihydroxy-17-[3'-furyl]-5α-androstan-3-one, and 11β,17β-dihydroxy-17-[3'furyl]-5β-androstan-3-one.

EXAMPLE 26

A solution of 3-iodofuran (26 g.), ether (500 ml.), and a 1.3 N etheral solution of n-butyllithium (92.6 ml.) is stirred at —60° C. for 30 minutes. A solution of 3β-tetrahydropyranyloxy-5α-androstan-17-one (26 g.), described in J. Am. Chem. Soc. 83, 1478 (1961), in toluene (700 ml.) is added. After stirring for 16 hours at room temperature, the reaction is worked as in Example 3, yielding 17α - [3'-furyl]-3β-tetrahydropyranyloxy-5α-androstan-17-ol.

A solution of the latter product (30.5 g.) p-toluenesulfonic acid (300 mg.), in methanol (300 ml.) is stirred for 1 hour at room temperature. Addition of water yields 17α-[3'-furyl]-5α-androstane-3β,17-diol, purified by crystallization with ethyl acetate-hexane M.P. 206–208° C.

By a similar method 3β-tetrahydropyranyloxy-5β-androstan-17-one prepared by the method described in J. Am. Chem. Soc. 83, 1478 (1961) is treated with 3-furyllithium to give 17α-[3'-furyl]-3β-tetrahydropyranyloxy-5β-androstan-17-ol. Hydrolysis of the protecting group in the latter compound gives 17α-[3'-furyl]-5β-androstane-3β,17-diol.

EXAMPLE 27

A solution of 17α-[3'-furyl]-5α-androstane-3β,17-diol (13.0 g.), described in Example 26, pyridine (130 ml.) and acetic anhydride (65 ml.), is left at room temperature for 16 hours. The reaction mixture is poured in ice-water and is extracted with ether. The ether solution is washed with dilute sulfuric acid, sodium bicarbonate and water, dried and evaporated. The crude product is crystallized from methylene chloride-hexane to give 3β-acetoxy-17α-[3'-furyl]-5α-androstan-17-ol, M.P. 133–134° C.

Similarly acylation with acylating agents other than acetic anhydride yields the corresponding 3β-acyloxy-17α-[3'-furyl]-5α-androstan-17-ol, such as, for example, 17α-[3'-furyl] - 3β-propionyloxy-5α-androstan-17-ol, and 3β-butanoyloxy-17α-[3'-furyl]-5α-androstan-17-ol.

By a similar procedure acylation of 17α-[3'-furyl]-5β-androstane-3β-17-diol, obtained in Example 26, yields the corresponding 3-acyloxy derivatives such as, for example, the 3β-acetoxy-, 3β-propionyloxy- or 3β-butanoyloxy-17α-[3'-furyl]-5β-androstan-17-ols.

EXAMPLE 28

A mixture of 17α-[3'-furyl]-17-hydroxy-5α-androstan-3-one (540 mg.), obtained in Example 23, ether (150 ml.), and a 25% solution of hydrochloric acid (50 ml.), is stirred for 30 minutes. The reaction is worked up as in Example 21, yielding 17-[3'-furyl]-5α-androst-16-en-3-one, purified by crystallization from methylene chloride-ether M.P. 195–196° C.

Similarly dehydration of 17α-[3'-furyl]-17-hydroxy-5β-androstan-3-one, 17α-[3'-furyl]-17-hydroxy-5α-androstane-3,11-dione, and 17α-[3'-furyl]-17-hydroxy-5β-androstane-3,11-dione obtained in Example 23 yields respectively 17-[3'-furyl]-5β-androst-16-en-3-one, 17-[3'-furyl]-5α-androst-16-ene-3,11-dione, 17-[3'-furyl]-5β-androst-16-ene-3,11-dione.

EXAMPLE 29

Dehydration, according to the precedure described in Example 28, of 17α-[3'-furyl]-5α-androstane-3β,17-diol and 17α-[3'-furyl]-5β-androstane-3β,17-diol, described in Example 26, yields respectively 17-[3'-furyl]-5α-androst-16-en-3β-ol, and 17-[3'-furyl]-5β-androst-16-en-3β-ol.

By a similar procedure dehydration of the 3β-acyloxy-17α-[3'-furyl]-5α-androstan-17-ols, and 3β-acyloxy-17α-[3'-furyl]-5β-androstan-17-ols described in Example 27, yields the corresponding 3β-acyloxy-17-[3'-furyl]-5α-androst-16-enes and 3β-acyloxy-17-[3'-furyl]-5β-androst-16-enes, such as, for example, the 3β-acetoxy-, 3β-propionyloxy- or 3β-butanoyloxy-17-[3'-furyl]-5α-androst-16-enes, and the 3β-acetoxy-, 3β-propionyloxy- or 3β-butanoyloxy-17-[3'-furyl]-5β-androst-16-enes.

EXAMPLE 30

Hydrogenation, according to the procedure given in Example 16 of 17-[3'-furyl]-5α-androst-16-en-3-one, 17-[3'-furyl]-5β-androst-16-en-3-one, 17-[3'-furyl]-5α-androst-16-ene-3,11-dione, and 17-[3'-furyl]-5β-androst-16-ene-3,11-dione, described in Example 28, yields respectively 17β-[3'-furyl]-5α-androstan-3-one M.P. 189–191° C., 17β-[3'-furyl]-5β-androstan-3-one, 17β-[3'-furyl]-5α-androstane-3,11-dione, and 17β-[3'-furyl]-5β-androstane-3,11-dione.

Similarly hydrogenation of 17-[3'-furyl]-androst-16-en-3β-ol, and 17-[3'-furyl]-5β-androst-16-en-3β-ol, obtained in Example 29, yields respectively 17β-[3'-furyl]-5α-androstan-3β-ol, and 17β-[3'-furyl]-5β-androstan-3β-ol.

By a similar procedure the 3β-acyloxy-17-[3'-furyl]-5α-androst-16-enes, and 3β-acyloxy-17-[3'-furyl]-5β-androst-16-enes, obtained in Example 29, are hydrogenated to give the corresponding 3β-acyloxy-17β-[3'-furyl]-5α-androstanes, and 3β-acyloxy-17β-[3'-furyl]-5β-androstanes, such as, for example, the 3β-acetoxy-, 3β-propionyloxy- or 3β-butanoyloxy-17β-[3'-furyl]-5α-androstanes, and the 3β-acetoxy-, 3β-propionyloxy- or 3β-butanoyloxy-17β-[3'-furyl]-5β-androstanes.

EXAMPLE 31

By a similar procedure as described in U.S. Patent No. 3,271,392, acetylation with acetic anhydride in pyridine solution at 100° C. for 24 hours, of 17α-[3'-furyl]-17-hydroxy-4-androsten-3-one, obtained in Example 3, 17α-[3'-furyl]-17-hydroxy-4-estren-3-one, and 17α-[3'-furyl]-17-hydroxy-4-estrene-3,11-dione, obtained in Example 5, 17α-[3'-furyl]-17-hydroxy-4-androstene-3,11-dione, obtained in Example 6, 17α-[3'-furyl]-17-hydroxy-5α-androstan-3-one,
17α-[3'-furyl]-17-hydroxy-5β-androstan-3-one,
17α-[3'-furyl]-17-hydroxy-5α-androstane-3,11-dione, and
17α-[3'-furyl]-17-hydroxy-5β-androstane-3,11-dione, described in Example 23, yields respectively 17β-acetoxy-17-[3'-furyl]-4-androsten-3-one,
17β-acetoxy-17-[3'-furyl]-4-estren-3-one,
17β-acetoxy-17-[3'-furyl]-4-estrene-3,11-dione,
17β-acetoxy-17-[3'-furyl]-4-androstene-3,11-dione,
17β-acetoxy-17-[3'-furyl]-5α-androstan-3-one,
17β-acetoxy-17-[3'-furyl]-5β-androstan-3-one,
17β-acetoxy-17-[3'-furyl]-5α-androstane-3,11-dione, and
17β-acetoxy-17-[3'-furyl]-5β-androstane-3,11-dione.

Similarly acetylation of 17α-[3'-furyl]-5α-androstane-3β,17-diol and 17α-[3'-furyl]-5β-androstane-3β,17-diol, described in Example 26, yields respectively 3β,17β-diacetoxy-17-[3'-furyl]-5α-androstane, and 3β,17-diacetoxy-17-[3'-furyl]-5β-androstane.

EXAMPLE 32

A 25.5% solution of diisobutyl aluminum hydride in dry tetrahydrofuran (72 ml.) is added dropwise to a stirred solution of digitoxigenin (15.0 g.) in tetrahydrofuran (200 ml.) at a temperature between −20° C. and −25° C. in an atmosphere of nitrogen. The reaction is continued for 20 minutes at the same temperature. A 10% aqueous sulfuric acid solution (50 ml.) is added and the mixture is poured into an aqeous solution of sodim bicarbonate. The mixture is filtered through Celite and extracted with ether. The ether is washed with water, dried and evaporated to dryness leaving crude 17β-[3'-furyl]-5β-androstane-3β,14β-diol, purified by crystallization from methylene chloride-ether M.P. 201–203° C.

Similarly, periplogenin and strophanthidol yield, upon reduction with diisobutyl aluminum hydride as above, 17β-[3'-furyl]-androstane-3β,5β,14β-triol and 17β-[3'-furyl]-androstane-3β,5β,14β,19-tetrol.

EXAMPLE 33

In the same manner as described in Example 32, the ethylenedioxy derivative of strophanthidin was reduced to 19-ethylenedioxy-17β-[3'-furyl]-5β-androstane-3β,5β,14β-triol. The later compound upon hydrolysis with 0.1 N hydrochloric acid in acetone solution is transformed into 17β-[3'-furyl]-3β,5β,14β-trihydroxyandrostan-19-al.

EXAMPLE 34

A solution of 17β-[3'-furyl]-5β-androstan-3β,14β-diol (10 g.) obtained as described in Example 32, pyridine (50 ml.) and acetic anhydride (25 ml.) is allowed to stand at room temperature overnight. Methanol (25 ml.) is added and the solution is poured into ice-water and extracted with ether. The ether is washed with dilute sulfuric acid, sodium bicarbonate and water. After drying and evaporating the solvent, the crude acetate is crystallized from aqueous methanol to yield 3β-acetoxy-17β-[3'-furyl]-5β-androstan-14β-ol, M.P. 155–157° C.

Similarly, acetylation of 17β-[3'-furyl]-androstane-3β,5β,14β-triol and 17β-[3'-furyl]-3β,5β,14β-trihydroxyandrostan-19-al yields the corresponding 3β-acetoxy-17β-[3'-furyl]-androstane-5β,14β-diol and 3β-acetoxy-5β,14β-dihydroxy-17β-[3'-furyl]-androstan-19-al. By a similar procedure acetylation of 17β-[3'-furyl]-androstane-3β,5β,14β,19-tetrol yields 3β,19-diacetoxy-17β-[3'-furyl]-androstane-5β,14β-diol.

EXAMPLE 35

By a similar procedure as described in Example 34, acylation with the appropriate lower aliphatic acid anhydrides or acyl chlorides such as, for example, propionic anhydride or butyric anhydride, in pyridine of 17β-[3'-furyl]-5β-androstane-3β,14β-diol, 17β-[3'-furyl]-androstane-3β,5β,14β-triol and 17β-[3'-furyl]-3β,5β,14β-trihydroxyandrostan-19-al yields the corresponding 3-acylates, 3-propionyloxy or 3β-butyryloxy-17β-[3'-furyl]-5β-androstan-14β-ol, 3β-propionyloxy or 3β-butylryloxy-17β-[3'-furyl]-androstane-5β,14β-diol, 3β-propionyloxy or 3β-butyryloxy-17β-[3'-furyl]-5β,14β-dihydroxyandrostan-19-al, respectively. In the same manner, acylation as above of 17β-[3'-furyl]-androstan-3β,5β,14β,19-tetrol yields the corresponding 3β,19-diacylates, 3β,19-dipropionyloxy or 3β,19-dibutylryloxy-17α - [3'-furyl] - androstane-5β,14β-diol, respectively.

EXAMPLE 36

A mixture of 17α-[3'-furyl]-3-methoxy-1,3,5(10)-estratrien-17-ol (17 g.), described in U.S. Patent No. 3,271,392, chloroform (850 ml.), sodium acetate (17 g.), acetic acid (17 ml.) and m-chloroperbenzoic acid (85%) (23.65 g.) is stirred at room temperature for 1 hour. Ether is added. The organic solution is washed with sodium bicarbonate and water, dried and evaporated. The residue is chromatographed on silica gel. The fractions eluted with 2% benzene-methanol are combined and crystallized with acetone-hexane to give 4,4-dihydroxy-3-[17'β-hydroxy - 3' - methoxy-1',3',5'(10)-estratrien-17'-yl]-2-butenoic acid lactone, M.P. 214–216° C.

EXAMPLE 37

A mixture of 17α-[3'-furyl]-3-methoxy-1,3,5(10)-estratrien-17-ol (6.0 g.), chloroform (67.5 ml.), peracetic acid (27 ml. of a 40% solution), and sodium acetate (2.7 g.), is stirred for 90 minutes at room temperature. The mixture is diluted with ether and the organic solution is washed with sodium bicarbonate and water. The solvents are dried and evaporated to dryness, yielding (4,4-dihydroxy-3-[17'β-hydroxy - 3' - methoxy-1',3',5'(10')-estratrien-17'-yl]-2-butenoic acid lactone, identical to the product obtained in Example 36.

EXAMPLE 38

By a similar procedure as described in Example 36 or 37, 17α-[3'-furyl]-1,3,5(10)-estratriene-3,17-diol and the other 3-alkoxy or 3-cycloalkoxy derivatives described in U.S. Patent No. 3,271,392, are respectively transformed into 4,4-dihydroxy - 3 - [3',17'β-dihydroxy-1',3',5'(10')-estratrien-17'-yl]-2-butenoic acid lactone and the corresponding 4,4-dihydroxy-3-[3'-alkoxy- or 3'-cycloalkoxy-17'β-hydroxy-1',3',5'(10')-estratrien-17'yl] - 2 - butenoic acid lactones, such as, for example, 4,4-dihydroxy-3-[3'-ethoxy-17'β-hydroxy-1',3',5'(10')-estratrien-17'-yl]-2-butenoic acid lactone,
4,4-dihydroxy-3-[17'β-hydroxy-3'-propoxy-1',3',5'(10')-estratrien-17'yl]-2-butenoic acid lactone,
4,4-dihydroxy-3-[17'β-hydroxy-3-isopropoxy-1',3',5'(10')-estratrien-17'-yl]-2-butenoic acid lactone,
4,4-dihydroxy-3-[3'-n-butoxy-17'β-hydroxy-1',3',5'(10')-estratrien-17'-yl]-2-butenoic acid lactone,
4,4'-dihydroxy-3-[3'-sec.-butoxy-17'β-hydroxy-1',3',5'(10')-estratrien-17'-yl]-2-butenoic acid lactone,
4,4-dihydroxy-3-[3'-cyclopentyloxy-17'β-hydroxy-1',3',5'(10')-estratrien-17'-yl]-2-butenoic acid lactone,
4,4-dihydroxy-3-[3'-cyclohexyloxy-17'β-hydroxy-1',3',5'(10')-estratrien-17'-yl]-2-butenoic acid lactone.

when oxidized with peracetic acid or m-chloroperbenzoic acid in the presence of acetic acid.

Similarly oxidation of the 3-acyloxy-17α-[3-furyl]-1,3,5,(10)-estratrien-17-ols described in U.S. Patent No. 3,271,392, yields 4,4-dihydroxy - 3 - [3'-acyloxy-17'β-hydroxy-1',3',5'(10')-estratrien-17'-yl]-2-butenoic acid lactones, such as for example: 4,4-dihydroxy-3-[3'-acetoxy-17'β-hydroxy-1',3',5'(10')-estratrien-17'-yl] - 2 - butenoic acid lacetone, 4,4-dihydroxy-3-[17'β-hydroxy-3'-propionyloxy-1',3',5'(10')-estratrien-17'-yl]-2-butenoic acid lactone, and 4,4-dihydroxy-3-[3'-butanoyloxy-17'β-hydroxy-1',3',5'(10')-estratrien-17'-yl]-2-butenoic acid lactone.

EXAMPLE 39

A solution of 4,4-dihydroxy-3-[17'β-hydroxy-3'-methoxy-1',3',5'(10')-estratrien-17'-yl]-2-butenoic acid lactone (6 g.), obtained in Example 36, or 37, pyridine (60 ml.), and acetic anhydride (60 ml.), is kept overnight at room temperature. The reaction is worked up as in Example 27. The crude product is chromatographed on silica gel and the fractions eluted with mixtures of benzene and ethyl acetate are combined and crystallized from methylene chloride-hexane yielding 4-acetoxy-3-[17'β-hydroxy-3'-methoxy-1',3',5'(10')-estratrien-17'-yl]-4-hydroxy-2-butenoic acid lactone, M.P. 198–201° C.

By a similar procedure acylation of 4,4-dihydroxy-3-[17'β-hydroxy-3'-methoxy-1',3',5'(10')-estratrien-17'-yl]-2-butenoic acid lactone with other acylating agents such as, for example, propionic or butyric anhydrides, yields the corresponding 4-acyloxy-3-[17'β-hydroxy-3'-methoxy-1',3',5'(10')-estratrien-17'-yl]-4-hydroxy-2-butenoic acid lactones such as, for example, 4-hydroxy-3-[17'β-hydroxy-3'-methoxy-1',3',5'(10') - estratrien-17'yl]-4-propionyloxy-2-butenoic acid lactone and 4-butanoyloxy-3-[17'β-hydroxy-3'-methoxy-1',3',5'(10')-estratrien-17'-yl]-4-hydroxy-2-butenoic acid lactone.

By a similar procedure acylation of the 4,4-dihydroxy-3 - [3' - alkoxy- or 3'-cycloalkoxy-17'β-hydroxy-1',3',5'(10')estratrien-17'-yl]-2-butenoic acid lactones and the 4,4 - dihydroxy-3-[3'-acyloxy-17'β-hydroxy-1',3',5'(10')-estratrien-17'-yl]-2-butenoic acid lactones, obtained in Example 38, yields respectively the 4-acyloxy-derivatives, such as, for example, the 4-acetoxy-, 4-propionyloxy- or 4 - butanoyloxy-3-[3'-acyloxy-17'β-hydroxy-1',3',5'(10')-droxy - 1',3',5'(10')-estratrien-17'-yl]-4-hydroxy-2-butenoic acid lactones, and the 4-acetoxy-, 4-propionyloxy- or 4 - butanoyloxy-3-[3'-acyloxy-17'β-hydroxy-1',3',5'(10')-estratrien-17'-yl]-4-hydroxy-2-butenoic acid lactones.

Similarly acylation of 4,4-dihydroxy-3-[3'-17'β-dihydroxy-1',3',5'(10')-estratrien-17'-yl]-2-butenoic acid lactone, obtained in Example 38, gives the corresponding 4-acyloxy - 3-[3'-acyloxy-17'β-hydroxy-1',3',5'(10')-estratrien-17'-yl]-4-hydroxy-2-butenoic acid lactones such as, for example, 4-acetoxy-3-[3'-acetoxy-17'β-hydroxy-1',3',5'(10')-estratrien-17'-yl]-4-hydroxy-2-butenoic acid lactone, 4 - hydroxy-3-[17'β-hydroxy-3'-propionyloxy-1',3',5'(10')-estratrien-17'-yl]-4-propionyloxy-2-butenoic acid lactone, and 4-butanoyloxy-3-[3'-butanoyloxy-17'β-hydroxy - 1',3',5'(10')-estratrien-17'-yl]-4-hydroxy-2-butenoic acid lactone.

EXAMPLE 40

A mixture of 17β-acetoxy-17-[3'-furyl]-3-methoxy-1,3,5(10)-estratriene (5 g.), described in U.S. Patent No. 3,271,392, chloroform (50 ml.), peracetic acid (20 ml. of a 40% solution) and sodium acetate (2 g.) is stirred for 90 minutes. The reaction is worked up as in Example 37, yielding 4,4-dihydroxy-3-[17'β-acetoxy-3'-methoxy-1',3',5'(10')-estratrien-17'-yl]-2-butenoic acid lactone, purified by crystallization with methanol-ether, M.P. 214–216° C.

Similarly oxidation of the other 17-acyloxy derivatives of 17α - [3'-furyl]-3-methoxy-1,3,5(10)-estratrien-17-ol, described in U.S. Patent No. 3,271,392, yields the corresponding 4,4-dihydroxy-3-[17'β-acyloxy-3'-methoxy-1',3',5'(10')-estratrien-17'-yl]-2-butenoic acid lactones, such as, for example, 4,4-dihydroxy-3-[3'-methoxy-17'β-propionyloxy-1',3',5'(10')-estratrien-17'yl]-2-butenoic acid lactone, and 4,4-dihydroxy-3-[17β-butanoyloxy-3'-methoxy - 1', 3', 5'(10') - estratrien-17'-yl]-2-butenoic acid lactone.

EXAMPLE 41

A solution of 4,4-dihydroxy-[17'β-acetoxy-3'-methoxy-1',3',5'(10')-estratrien-17'-yl]-2-butenoic acid lactone (1.5 g.) obtained in Example 40, pyridine (15 ml.), and acetic anhydride (15 ml.) is left at room temperature for 16 hours. The reaction is worked up as in Example 27, and the residue is chromatographed on silica gel. The fractions eluted with mixtures of ethyl acetate and benzene are combined and crystallized from methylene chloride-hexane to yield 4-acetoxy-3-[17'β-acetoxy-3'-methoxy - 1',3',5'10')-estratrien-17'-yl]-4-hydroxy-2-butenoic acid lactone, M.P. 229–231° C.

EXAMPLE 42

A solution of 17β-[3'-furyl]-3-methoxy-1,3,5(10)-estratriene (14.5 g.), obtained in Example 2, chloroform (145 ml.), peracetic acid (14.5 ml. of a 40% solution), and sodium acetate (1.45 g.), is stirred for 30 minutes at room temperature. The reaction is worked up as in Example 37, yielding 4,4-dihydroxy-3-[3'-methoxy-1',3',5'(10')estratrien-17'β-yl]-2-butenoic acid lactone, purified by crystallization with ether, M.P. 191–194° C.

By a similar procedure oxidation of 17β-[3'-furyl]-1,3,5(10)-estratrien-3-ol, obtained in Example 2, yields 4,4 - dihydroxy - 3 - [3'-hydroxy-1',3',5'(10')-estratrien-17'β-yl]-2-butenoic acid lactone.

EXAMPLE 43

To a mixture of 17β-[3'-furyl]-3-methoxy-1,3,5(10)-estratriene (6.84 g.), chloroform (342 ml.), sodium acetate (6.84 g.), and acetic acid (6.84 ml.) is added at room temperature to a solution of 85% m-chloroperbenzoic acid (9.5 g.), in chloroform (95 ml.). The reaction mixture is stirred at room temperature for 1 hour and the reaction product is isolated as in Example 36, yielding 4,4-dihydroxy-3-[3'-methoxy-1',3',5'(10')-estratrien-17'β-yl]-2-butenoic acid lactone.

EXAMPLE 44

By a procedure similar to those described in Example 42 or 43 the other 3-alkoxy-17β-[3'-furyl]-1,3,5(10)-estratrienes and the 3-cycloalkoxy-17β-[3'-furyl]-1,3,5(10)-estratrienes, obtained in Example 2, are respectively transformed into the corresponding 4,4-dihydroxy-3-[3' - alkoxy- or 3'-cycloalkoxy-1',3',5'(10')-estratrien-17'β-yl]-2-butenoic acid lactones, such as for example:

4,4 - dihydroxy-3-[3'-ethoxy-1',3',5'(10')-estratrien-17'β-yl]-2-butenoic acid lactone,
4,4-dihydroxy-3-[3'-propoxy-1',3',5'(10')-estratrien-17'β-yl]-2-butenoic acid lactone,
4,4-dihydroxy-3-[3'-isopropoxy-1',3',5'(10')-estratrien-17'β-yl]-2-butenoic acid lactone,
4,4-dihydroxy-3-[3'-n-butoxy-1',3',5'(10')-estratrien-17'β-yl]-2-butenoic acid lactone,
4,4-dihydroxy-3-[3'-sec.-butoxy-1',3',5'(10')-estratrien-17'β-yl]-2-butenoic acid lactone,
4,4-dihydroxy-3-[3'-cyclopentyloxy-1',3',5'(10')-estratrien-17'β-yl]-2-butenoic acid lactone, and
4,4-dihydroxy-3-[3'-cyclohexyloxy-1',3',5'(10')-estratrien-17'β-yl]-2-butenoic acid lactone.

Similarly oxidation of the 3-acyloxy-17β-[3'-furyl]-1,3,5(10)-estratrienes, obtained in Example 2, yields 4,4-dihydroxy - 3 - [3'-acyloxy-1',3',5'(10')-estratrien-17'β-yl]-2-butenoic acid lactones, such as, for example: 4,4-dihydroxy - 3 - [3'-acetoxy-1',3',5'(10')-estratrien-17'β-yl]-2-butenoic acid lactone, 4,4-dihydroxy-3-[3'-propionyloxy-1',3',5'(10')-estratrien-17'β-yl]-2-butenoic acid lactone, 4,4 - dihydroxy3-[3'-butanoyloxy-1',3',5'(10')-estratrien-17'β-yl]-2-butenoic acid lactone.

EXAMPLE 45

A solution of 4,4 - dihydroxy - 3-[3'-methoxy-1',3',5'(10')-estratrien-17'β-yl]-2-butenoic acid lactone (7.05 g.), obtained in Example 42, or 43, pyridine (70 ml.), and acetic anhydride (70 ml.), is left overnight at room temperature. The reaction is worked up as in Example 27 and the residue is crystallized from acetone-methanol to give 4 - acetoxy-3-[3'-methoxy-1',3',5'(10')-estratrien-17'β-yl]-4-hydroxy-2-butenoic acid lactone, M.P. 236–238° C.

By a similar procedure acylation of 4,4-dihydroxy-3-[3' - methoxy - 1',3',5'(10')-estratrien-17'β-yl]-2-butenoic acid lactone with acylating agents other than acetic anhydride, such as, for example, propionic or butyric anhydrides, yield the corresponding 4-acyloxy-3-[3'-methoxy-1',3',5'(10') - estratrien - 17'β - yl]-4-hydroxy-2-butenoic acid lactones, such as, for example 4-hydroxy-3-[3'-methoxy - 1',3',5'(10') - estratrien-17'β-yl]-4-propionyloxy-2-butenoic acid lactone, and 4-butanoyloxy-3-[3'-methoxy-1',3',5'(10')-estratrien-17'β-yl]-4-hydroxy-2-butenoic acid lactone.

By a similar method acylation of 4,4-dihydroxy-3-[3'-hydroxy - 1',3',5'(10') - estratrien-17'β-yl]-2-butenoic acid lactone, obtained in Example 42, yields the corresponding 4 - acyloxy - 3-[3'-acyloxy-1',3',5'(10')-estratrien-17',β-yl]-4-hydroxy-2-butenoic acid lactones such as, for example: 4 - acetoxy - 3-[3'-acetoxy-1',3',5'(10')-estratrien-17'β - yl] - 4-hydroxy-2-butenoic acid lactone, 4-hydroxy-3 - [3' - propionyloxy-1',3',5'(10')-estratrien-17'β-yl]-4-propionyloxy-2-butenoic acid lactone and 4-butanoyloxy-3 - [3' - butanoyloxy-1',3',5'(10')-estratrien-17'β-yl]-hydroxy-2-butenoic acid lactone.

Similarly acylation of the 4,4-dihydroxy-3-[3'-alkoxy-or 3' - cycloalkoxy-1',3',5'(10')-estratrien-17'β-yl]-2-butenoic acid lactones and the 44-dihydroxy-3-[3'-acyloxy-1',3',5'(10')-estratrien-17'β-yl]-2-butenoic acid lactones, obtained in Example 44, yields respectively the corresponding 4-acyloxy derivatives such as, for example the 4-acetoxy-, 4-propionyloxy-, or 4-butanoyloxy-3-[3'-alkoxy- or 3'-cycloalkoxy-1',3',5'(10')-estratrien-17'β-yl]-4-hydroxy-2-butenoic acid lactones and the 4-acetoxy-, 4-propionyloxy- or 4 - butanoyloxy - 3 - [3'-acyloxy-1,3,5'(10') - estratrien - 17'β - yl]-4-hydroxy-2-butenoic acid lactones.

EXAMPLE 46

A mixture of 17α - [3'-furyl]-17-hydroxy-4-androsten-3-one (2.5 g.), obtained in Example 3, chloroform (25 ml.), peracetic acid (2.5 ml. of a 40% soltuion), and sodium acetate (1 g.), is stirred overnight at room temperature. The reaction is worked up as in Example 37 yielding 4,4 - dihydroxy - 3 - [17'β-hydroxy-3'-oxo-4'-androsten-17'-yl]-2-butenoic acid lactone.

Similarly oxidation of 17α - [3'-furyl]-17-hydroxy-4-androstene-3,11-dione, described in Example 6, 17α-[3'-furyl] - 17 - hydroxy-4-estren-3-one and 17α-[3'-furyl]-17-hydroxy-4-estrene-3,11-dione, obtained in Example 5, and 11β,17β - dihydroxy-17-[3'-furyl]-4-androsten-3-one, and 11β,17β - dihydroxy-17-[3'-furyl]-4-estren-3-one, prepared in Example 11, respectively yields, 4,4-dihydroxy-3-[3',11'-dioxo-17'β-hydroxy-4'-androsten-17'-yl]-2-butenoic acid lactone,
4,4-dihydroxy-3-[17'β-hydroxy-3'-oxo-4'-estren-17'-yl]-2-butenoic acid lacetone,
4,4-dihydroxy-3-[11'β,17'β-dihydroxy-3'-oxo-4'-estren-17'-yl]-2-butenoic acid lactone,
4,4-dihydroxy-3-[11'β-17'β-dihydroxy-3'-oxo-4'-androsten-17'-yl]-2-butenoic acid lactone, and
4,4-dihydroxy-3-[11'β,17'β-dihydroxy-3'-oxo-4'-estren-17'-yl]-2-butenoic acid lactone.

EXAMPLE 47

A solution of 4,4-dihydroxy-3-[17'β-hydroxy-3'-oxo-4'-androsten-17'-yl]-2-butenoic acid lactone (1.98 g.), obtained in Example 46, pyridine (20 ml.), and acetic anhydrides, yield the corresponding 4-acyloxy-3-([3'-methoxy-reaction is worked up as in Example 27, and the residue is chromatographed on silica gel. The fractions eluted with mixtures of benzene and ethyl acetate are combined and crystallized from acetone-hexane to give 4-actoxy-3-[17'β-hydroxy - 3' - oxo-4'-androsten-17'-yl]-4-hydroxy-2-butenoic acid lactone, M.P. 238–24° C.

By a similar procedure acetylation of 4,4-dihydroxy-3-[3',11'-dioxo-17'β-hydroxy-4'-androsten-17'-yl]-2-butenoic acid lactone,
4,4-dihydroxy-3-[17'β-hydroxy-3'-oxo-4'-estren-17'-yl]-2-butenoic acid lactone,
4,4-dihydroxy-3-[3',11'-dioxo-17'β-hydroxy-4'-estren-17'-yl]-2-butenoic acid lactone,
4,4-dihydroxy-2-[11'β,17'β-dihydroxy-3'-oxo-4'-androsten-17'-yl]-2-butenoic acid lactone, and
4,4-dihydroxy-3-[11'β,17'β-dihydroxy-3'-oxo-4'-estren-17'-yl]-2-butenoic acid lactone yields respectively:

4-acetoxy-3-[3',11'-dioxo-17'β-hydroxy-4'-androsten-17'-yl]-4-hydroxy-2-butenoic acid lactone, 4-acetoxy-3-[17′β-hydroxy-3′-oxo-4′-estren-17′-yl]-4-hydroxy-2-butenoic acid lactone, 4-acetoxy-3-[3′,11′-dioxo-17′β-hydroxy-4′-estren-17′-yl]-4-hydroxy-2-butenoic acid lactone, 4-acetoxy-3-[11′β,17′β-dihydroxy-3′-oxo-4′-androsten-17′yl]-4-hydroxy 2-butenoic acid lactone, and 4-acetoxy-3-[11′β,17′β-dihydroxy-3′-oxo-4′-estren-17′-yl]-4-hydroxy-2-butenoic acid lactone.

EXAMPLE 48

A mixture of 17β-[3′-furyl]-4-androsten-3-one (2.3 g.), obtained in Example 19, chloroform (23 ml.), peracetic acid (2.3 ml. of a 40% solution), and sodium acetate (230 mg.), is stirred at room temperature for 42 hours. The crystalline insoluble product that forms is filtered and further crystallized from methanol yielding 4,4-dihydroxy-3-[3′-oxo-4′-androsten-17′β-yl]-2-butenoic acid lactone, M.P. 270–273° C.

In the same manner oxidation of 17β-[3′-furyl]-4-estren-3-one, obtained in Example 19, 17β-[3′-furyl]-4-androstene-3,11-dione, and 17β-[3′-furyl]-4-estrene-3,11-dione, described in Example 20, yields respectively 4,4-dihydroxy-3-[3′-oxo-4′-estren-17′β-yl]-2-butenoic acid lactone, 4,4-dihydroxy-3-[3′,11′-dioxo-4′-androsten-17′β-yl]-2-butenoic acid lactone, and 4,4-dihydroxy-3-[3′,11′-dioxo-4′-estren-17′-yl]-2-butenoic acid lactone.

EXAMPLE 49

A mixture of 17β-[3′-furyl]-11β-hydroxy-4-androsten-3-one (10 g.), obtained in Example 18, chloroform (100 ml.), sodium acetate (10 g.), and peracetic acid (40% solution), (10 ml.), is stirred for 24 hours at room temperature. The crystalline product is filtered, washed with water and then acetone. Further crystallizations from nitromethane yields 4,4-dihydroxy-3-[11′β-hydroxy-3′-oxo-4′-androsten-17′-yl]-2-butenoic acid lactone, M.P. 267–269° C.

Similarly oxidation of 17β-[3′-furyl]-11β-hydroxy-4-estren-3-one, obtained in Example 18, yields 4,4-dihydroxy - 3 - [11′β - hydroxy - 3′ - oxo - 4′ - estren - 17′β-yl]-2-butenoic acid lactone.

EXAMPLE 50

A solution of 4,4-dihydroxy-3-[3′-oxo-4′-androsten-17′β-yl]-2-butenoic acid lactone (2.1 g.), obtained in Example 48, pyridine (25 ml.), and acetic anhydride (25 ml.), is left at room temperature for 16 hours. The reaction is worked up as in Example 27, and the residue is chromatographed on silica gel. The fractions eluted with mixtures of benzene and ethyl acetate are combined and crystallized from acetone-hexane to yield 4-acetoxy-3-[3′-oxo-4′-androsten-17′β-yl]-4-hydroxy-2-butenoic acid lactone, M.P. 234–237° C.

Similarly acetylation of 4,4-dihydroxy-3-[3′-oxo-4′-estren-17′β-yl]-2-butenoic acid lactone, 4,4-dihydroxy-3-[3′,11′-dioxo-4′-androsten-17′β-yl]-2-butenoic acid lactone and 4,4-dihydroxy-3-[3′,11′-dioxo-4′-estren-17′β-yl]-2-butenoic acid lactone, described in Example 48, yields respectively 4-acetoxy-3-[3′-oxo-4′-estren-17′β-yl]-4-hydroxy-2-butenoic acid lactone, 4-acetoxy-3-[3′,11′-dioxo-4′-androsten-17′β-yl]-4-hydroxy-2-butenoic acid lactone, and 4 - acetoxy - 3 - [3′,11′ - dioxo - 4′ - estren - 17′β - yl]-4-hydroxy-2-butenoic acid lactone.

By a similar procedure, acetylation of 4,4-dihydroxy-3-[11′β - hydroxy - 3′ - oxo - 4′ - androsten - 17′β - yl] - 2-butenoic acid lactone, and 4,4-dihydroxy-3-[11′β-hydroxy-3′-oxo-4′-estren-17′β-yl]-2-butenoic acid lactone, yields respectively 4-acetoxy-3-[11′β-hydroxy-3′-oxo-4′-androsten-17′β-yl]-4-hydroxy-2-butenoic acid lactone, and 4-acetoxy - 3 - [11′β - hydroxy - 3′ - oxo - 4′ - estren - 17′β-yl]-hydroxy-2-butenoic acid lactone.

EXAMPLE 51

A mixture of 17α-[3′-furyl]-17-hydroxy-5α-androstan-3-one (5.0 g.), obtained in Example 23, chloroform (50 ml.), peracetic acid (40 ml. of a 40% solution), sodium acetate (4.0 g.), is stirred at room temperature for 15 minutes. The reaction is worked up as in Example 37 to yield 4,4-dihydroxy-3-[17′β-hydroxy-3′-oxo-5α-androstan-17′-yl]-2-butenoic acid lactone, purified by crystallization with methylene chloride-hexane, M.P. 260–262° C.

Similarly oxidation of 17α-[3′-furyl]-17-hydroxy-5β-androstan - 3 - one, 17α - [3′ - furyl] - 17 - hydroxy - 5α-androstane-3,11-dione, and 17α-[3′-furyl]-17-hydroxy-5β-androstane-3,11-dione, obtained in Example 23, yields respectively 4,4-dihydroxy-3-[17′β-hydroxy-3′-oxo-5β-androstan-17′-yl]-2-butenoic acid lactone, 4,4-dihydroxy-3-[3′,11′ - dioxo - 17′β - hydroxy - 5′α - androstan - 17′-yl]-2-butenoic acid lactone, and 4,4-dihydroxy-3-[3′,11′-dioxo-17′β-hydroxy-5′β-androstan-17′-yl]-2-butenoic acid lactone.

By a similar procedure, oxidation of 11β,17β-dihydroxy-17 - [3′ - furyl] - 5α - androstan - 3 - one, and 11β,17β-dihydroxy-17-[3′-furyl]-5β-androstan-3-one yields respectively 4,4-dihydroxy-3-[11′β,17′β-dihydroxy-3′-oxo-5′α-androstan-17′-yl]-2-butenoic acid lactone and 4,4-dihydroxy - 3 - [11′β,17′β - dihydroxy - 3′ - oxo - 5′β - androstan-17′-yl]-2-butenoic acid lactone.

EXAMPLE 52

A mixture of 3β-acetoxy-17α-[3′-furyl]-5α-androstan-17-ol (1.2 g.), obtained in Example 27, chloroform (50 ml.), peracetic acid (1.2 ml. of a 40% solution) and sodium acetate (1.2 g.), is stirred at room temperature for 1 hour. The reaction is worked up as in Example 37, and the residue is crystallized from ether to give 4,4-dihydroxy - 3 - [3′β - acetoxy - 17′β - hydroxy - 5′α - androstan-17′-yl]-2-butenoic acid lactone, M.P. 258–262° C.

Similarly oxidation of 17α-[3′-furyl]-3β-propionyloxy-5α-androstan-17-ol, and 3β-butanoyloxy-17α-[3′-furyl]-5α-androstan-17-ol yields respectively 4,4-dihydroxy-3-[17β-hydroxy - 3′β - propionyloxy - 5′α - androstan - 17′ - yl]-2-butenoic acid lactone and 4,4-dihydroxy-3-[3′β-butanoyloxy - 17′β - hydroxy - 5′α - androstan - 17′ - yl] - 2-butenoic acid lactone.

By a similar manner oxidation of the 3β-acyloxy-17α-[3′-furyl]-5β-androstan-17-ols, obtained in Example 27, yields the corresponding 4,4-dihydroxy-3-[3′β-acyloxy-17′β-hydroxy-5′β-androstan-17′-yl]-2-butenoic acid lactones.

In a similar manner oxidation of 17α-[3′-furyl]-5α-androstane-3β,17-diol and 17α-[3′-furyl]-5β-androstane-3β,17-diol, described in Example 26, yields respectively, 4,4 - dihydroxy - 3 - [3′β,17′β - dihydroxy - 5′α - androstan-17′-yl]-2-butenoic acid lactone, and 4,4-dihydroxy-3 - [3′β,17′β - dihydroxy - 5′β - androstan - 17′yl] - 2-butenoic acid lactone.

EXAMPLE 53

Acetylation as described in Example 39, of 4,4 - dihydroxy - 3 - [3′β,17′β - dihydroxy - 5′α - androstan-17′-yl]-2-butenoic acid lactone, and 4,4 - dihydroxy - 3-[3′β, 17′β - dihydroxy-5′β-androstan-17′-yl] - 2 - butenoic acid lactone, obtained in Example 52, yields respectively, 4 - acetoxy - 3 - [3′β-acetoxy-17′β - hydroxy - 5′α-androstan-17′-yl] - 4 - hydroxy - 2 - butenoic acid lactone, and 4-acetoxy - 3 - [3′β-acetoxy - 17′β - hydroxy-5′β-androstan-17′yl]-4-hydroxy-2-butenoic acid lactone.

By a similar manner acetylation of the 4,4-dihydroxy-3 - [3′β -acyloxy - 17′β - hydroxy - 5′α - androstan-17′-yl]-2 - butenoic acid lactones, and 4,4 - dihydroxy-3-[3′β, acyloxy-17′β-hydroxy-5′β-androstan-17′-yl] - 2 - butenoic acid lactones, obtained in Example 52 yields respectively the 4-acetoxy-3-[3′β-acyloxy-17′β-hydroxy-5′α-androstan-17′-yl]-4-hydroxy-2-butenoic acid lactones and the 4-acetoxy - 3 - [3′β-acyloxy-17′β-hydroxy - 5′β - androstan-17′-yl]-4-hydroxy-2-butenoic acid lactones.

Similarly, 4,4-dihydroxy-3-[17′β-hydroxy-3′-oxo-5′α-androstan-17′-yl]-2-butenoic acid lactone,
4,4-dihydroxy-3-[17′β-hydroxy-3′oxo-5′β-androstan-17′-yl]-2-butenoic acid lactone,
4,4-dihydroxy-3-[3′,11′-dioxo-17′β-hydroxy-5′α-androstan17′-yl]-2-butenoic acid lactone,
4,4-dihydroxy-3-[3′,11′-dioxo-17′β-hydroxy-5′β-androstan-17′-yl]-2-butenoic acid lactone,
4,4-dihydroxy-3-[11′β,17′β-dihydroxy-3′-oxo-5′α-androstan-17′-yl]-2-butenoic acid lactone, and
4,4-dihydroxy-3-[11′β,17′β-dihydroxy-3′-oxo-5′β-androstan-17′-yl]-2-butenoic acid lactone, described in Example 51, are acetylated to yield respectively 4-acetoxy-3-[17′β-hydroxy-3′-oxo-5′α-androstan-17′-yl]-4-hydroxy-2-butenoic acid lactone,
4-acetoxy-3-[17′β-hydroxy-3′-oxo-5β-androstan-17′-yl]-4-hydroxy-2-butenoic acid lactone,
4-acetoxy-3-[3′11′-dioxo-17′β-hydroxy-5′α-androstan-17′-yl]-4-hydroxy-2-butenoic acid lactone,
4-acetoxy-3-[3′,11′-dioxo-17′β-hydroxy-5′β-androstan-17′-yl]-4-hydroxy-2-butenoic acid lactone,
4-acetoxy-3-[11′β,17′β-dihydroxy-3′-oxo-5′α-androstan-17′-yl]-4-hydroxy-2-butenoic acid lactone, and
4-acetoxy-3-[11′β-dihydroxy-3′-oxo-5′β-androstan-17′-yl]-4-hydroxy-2-butenoic acid lactone.

EXAMPLE 54

A mixture of 17β-[3′-furyl]-5α-androstan-3-one (3.8 g.), obtained in Example 30, chloroform (100 ml.), peracetic acid (3.8 ml. of a 40% solution), and sodium acetate (3.8 g.) is stirred at room temperature for 1 hour. The reaction is worked up as in Example 37, to give 4,4 - dihydroxy - 3-[3′ - oxo - 5′α - androstan - 17′β-yl]-2-butenoic acid lactone, purified by crystallization with ether, M.P. 284–289° C.

Similarly oxidation of 17β-[3′-furyl]-5β-androstan-3-one, 17β-[3′-furyl]-5α-androstane - 3,11 - dione, and 17β-[3′-furyl]-5β-androstane-3,11-dione, obtained in Example 30, yields respectively 4,4-dihydroxy-3[3′-oxo-5′β-androstan-17′β-yl]-2-butenoic acid lactone, 4,4-dihydroxy-3-[3′,11′-dioxo-5′α-androstan-17′β-yl]-2-butenoic acid lactone, and 4,4 - dihydroxy-3-[3′,11′-dioxo-5′β-androstan - 17′β-yl]-2-butenoic acid lactone.

EXAMPLE 55

A mixture of 3β - acetoxy-17β-[3′furyl]-5α-androstane (150 mg.), obtained in Example 30, chloroform (7.5 ml.), peracetic acid (0.6 ml. of a 40% solution), and sodium acetate (60 mg.) is stirred at room temperature as in Example 37. The crude reaction product is crystalized from methylene chloride-ether to give 4,4-dihydroxy-3-[3′β-acetoxy-5′α-androstan-17′β-yl] - 2-butenoic acid lactone, M.P. 254–256° C.

By a similar procedure, but replacing chloroform by acetone, benzene, dioxan, methanol, tetrahydrofuran, ethyl acetate, ether, or acetic acid, 3β-acetoxy-17′β-[3′-furyl]-5α-androstane is oxidized with peracetic acid for periods of time ranging from 1 hour to 60 hours to give 4,4-dihydroxy-3-[3′β-acetoxy-5′α - androstan - 17′β - yl]-2-butenoic acid lactone, identical in all respects with the product obtained when chloroform is the solvent.

Similarly the other 3β-acyloxy-17β-[3′-furyl]-5α-androstanes, described in Example 30 are oxidized to the corresponding 4,4 - dihydroxy-3-[3′β-acyloxy-5′α-androstan-17′β-yl]-2-butenoic acid lactones such as, for example 4,4-dihydroxy-3-[3′β-propionyloxy - 5′α - androstan-17′β-yl] - 2 - butenoic acid lactone and 4,4-dihydroxy-3-[3′β-butanoyloxy-5′α-androstan - 17′β - yl] - 2 - butenoic acid lactone.

By a similar procedure oxidation of 17β-[3′-furyl]-5α-androstan-3β-ol, 17β-[3′-furyl]-5β-androstan - 3β-ol, and the 3β-acyloxy-17β-[3′-furyl]-5β-androstanes, obtained in Example 30 yields respectively 4,4-dihydroxy-3-[3′β-hydroxy-5′α-androstan-17′β-yl]-2-butenoic acid lactone, 4,4-dihydroxy - 3 - [3′β-hydroxy - 5′β - androstan-17′β-yl]-2-butenoic acid lactone and 4,4-dihydroxy-3-[3′β-acyloxy-5′β-androstan-17′β-yl]-2-butenoic acid lactones.

EXAMPLE 56

Acetylation as in Example 39 of 4,4-dihydroxy-3-[3′β-hydroxy-5′α-androstan-17′β-yl]-2-butenoic acid lactone, and 4,4-dihydroxy-3-[3′β-hydroxy-5′β-androstan-17′β-yl]-2-butenoic acid lactone, yields respectively 4-acetoxy-3-[3′β-acetoxy-5′α-androstan-17′β-yl]-4-hydroxy-2-butenoic acid lactone and 4-acetoxy-3-[3′β-acetoxy-5′β-androstan-17′β-yl]-4-hydroxy-2-butenoic acid lactone.

Similarly acetylation of the 4,4-dihydroxy-3-[3′β-acyloxy-5′α-androstan-17′β-yl]-2-butenoic acid lactones, and the 4,4-dihydroxy-3-[3′β-acyloxy-5′β-androstan-17′β-yl]-2-butenoic acid lactones, yields the corresponding 4-acetoxy-3-[3′β-acyloxy - 5′α - androstan-17′β-yl]-4-hydroxy-2-butenoic acid lactones and 4-acetoxy-3-[3′β-acyloxy-5′β-androstan-17′β-yl]-4′-hydroxy-2-butenoic acid lactones.

By a similar procedure, acetylation of 4,4-dihydroxy-3-[3′-oxo-5′α-androstan-17′β-yl]-2-butenoic acid lactone,
4,4-dihydroxy-3-[3′-oxo-5′β-androstan-17′β-yl]-2-butenoic acid lactone,
4,4-dihydroxy-3-[3′,11′-dioxo-5′α-androstan-17′β-yl]-2-butenoic acid lactone, and
4,4-dihydroxy-3-[3′,11′-dioxo-5′β-androstan-17′β-yl]-2-butenoic acid lactone, yields respectively:

4-acetoxy-3-[3′-oxo-5′α-androstan-17′β-yl]-4-hydroxy-2-butenoic acid lactone,
4-acetoxy-3-[3′-oxo-5′β-androstan-17′β-yl]-4-hydroxy-2-butenoic acid lactone,
4-acetoxy-3-[3′,11′-dioxo-5′α-androstan-17′β-yl]-4-hydroxy-2-butenoic acid lactone, and
4-acetoxy-3-[3′,11′-dioxo-5′β-androstan-17′β-yl]-4-hydroxy-2-butenoic acid lactone.

EXAMPLE 57

By a similar procedure as described in Example 36 or 37,

17β-acetoxy-17-[3′-furyl]-4-androsten-3-one,
17β-acetoxy-17-[3′-furyl]-4-estren-3-one,
17β-acetoxy-17-[3′-furyl]-4-estrene-3,11-dione,
17β-acetoxy-17-[3′-furyl]-4-androstene-3,11-dione,
17β-acetoxy-17-[3′-furyl]-5α-androstan-3-one,
17β-acetoxy-17-[3′-furyl]-5β-androstan-3-one,
17β-acetoxy-17-[3′-furyl]-5α-androstane-3,11-dione and
17β-acetoxy-17-[3′-furyl]-5β-androstane-3,11-dione are transformed respectively by oxidation to:

4,4-dihydroxy-3-[17′β-acetoxy-3′-oxo-4′-androsten-17′-yl]-2-butenoic acid lactone,
4,4-dihydroxy-3-[17′β-acetoxy-3′-oxo-4′-estren-17′-yl]-2-butenoic acid lactone,
4,4-dihydroxy-3-[17′β-acetoxy-3′,11′-dione-4′-estren-17′-yl]-2-butenoic acid lactone,
4,4-dihydroxy-3-[17′β-acetoxy-3′,11′-dioxo-4′-androsten-17′-yl]-2-butenoic acid lactone,
4,4-dihydroxy-3-[17′β-acetoxy-3′-oxo-5′α-androstan-17′-yl]-2-butenoic acid lactone,
4,4-dihydroxy-3-[17′β-acetoxy-3′-oxo-5′β-androstan-17′-yl]-2-butenoic acid lactone,
4,4-dihydroxy-3-[17′β-acetoxy-3′,11′-dioxo-5′α-androstan-17′-yl]-2-butenoic acid lactone, and
4,4-dihydroxy-3-[17′β-acetoxy-3′,11′-dioxo-5′β-androstan-17′-yl]-2-butenoic acid lactone.

EXAMPLE 58

Acetylation as in Example 39 of 4,4-dihydroxy-3-[17'β-acetoxy-3'-oxo-4'-androsten-17'-yl]-2-butenoic acid lactone,
4,4-dihydroxy-3-[17'β-acetoxy-3'-oxo-4'-estren-17'-yl]-2-butenoic acid lactone,
4,4-dihydroxy-3-[17'β-acetoxy-3',11'-dioxo-4'-estren-17'-yl]-2-butenoic acid lactone,
4,4-dihydroxy-3-[17'β-acetoxy-3',11',-dioxo-4'-androsten-17'-yl]-2-butenoic acid lactone,
4,4-dihydroxy-3-[17'β-acetoxy-3'-oxo-5'α-androstan-17'-yl]-2-butenoic acid lactone,
4,4-dihydroxy-3-[17'β-acetoxy-3'-oxo-5'β-androstan-17'-yl]-2-butenoic acid lactone,
4,4-dihydroxy-3-[17'β-acetoxy-3',11'-dioxo-5'α-androstan-17'-yl]-2-butenoic acid lactone, and
4,4-dihydroxy-3-[17'β-acetoxy-3',11'-dioxo-5'β-androstan-17'-yl]-2-butenoic acid lactone yields respectively:

4-acetoxy-3-[17'β-acetoxy-3'-oxo-4'-androsten-17'-yl]-4-hydroxy-2-butenoic acid lactone,
4-acetoxy-3-[17'β-acetoxy-3'-oxo-4'-estran-17'yl]-4-hydroxy-2-butenoic acid lactone,
4-acetoxy-3-[17'β-acetoxy-3',11'-dioxo-4'-estren-17'-yl]-4-hydroxy-2-butenoic acid lactone,
4-acetoxy-3-[17'β-acetoxy-3',11'-dioxo-4'-androsten-17'-yl]-4-hydroxy-2-butenoic acid lactone,
4-acetoxy-3-[17'β-acetoxy-3'-oxo-5'α-androstan-17'-yl]-4-hydroxy-2-butenoic acid lactone,
4-acetoxy-3-[17'β-acetoxy-3'-oxo-5'β-androstan-17'-yl]-4-hydroxy-2-butenoic acid lactone,
4-acetoxy-3-[17'β-acetoxy-3',11'-dioxo-5'α-androstan-17'-yl]-4-hydroxy-2-butenoic acid lactone, and
4-acetoxy-3-[17'β-acetoxy-3',11'-dioxo-5'β-androstan-17'-yl]-4-hydroxy-2-butenoic acid lactone.

EXAMPLE 59

A mixture of 3β-acetoxy-17β-[3'-furyl]-5β-androstan-14β-ol, obtained in Example 34 (1 g.), anhydrous sodium acetate (1 g.), 40% peracetic acid (1 ml.), and chloroform (25 ml.), is stirred at room temperature for 30 minutes. The reaction mixture is diluted with chloroform and the organic layer is washed with water until free of peracid. The chloroform is dried and evaporated to dryness. The residue is triturated with acetone (15 ml.), and the resulting solid is crystallized from aqueous tetrahydrofuran thus yielding 3β-acetoxy-14,21-dihydroxy-5β-card-20(22)-enolide, M.P. 192–196° C.

Similarly, 3β-acetoxy-17β-[3'-furyl]-androstane-5β,14β-diol, 3β-acetoxy-5β,14β-dihydroxy-17β-[3'-furyl]-androstan-19-al and 3β,19-diacetoxy-17β-[3'-furyl]-androstane-5β,14β-diol obtained in Example 34, yield when treated as above, with peracetic acid 3β-acetoxy-5β,14,21-trihydroxycard-20(22)-enolide, 3β-acetoxy-19-oxo-5β,14,21-trihydroxycard-20(22)-enolide and 3β,19-diacetoxy-5β,14,21-trihydroxycard-20(22)-enolide.

In a similar manner oxidation with peracetic acid of the 3-propionates or 3-butyrates of 17β-[3'-furyl]-5β-androstane-3β,14β-diol, 17β-[3'-furyl]-androstane-3β,5β,14β-triol and 17β-[3'-furyl]-3β,5β,14β-trihydroxyandrostan-19-al described in Example 35, yield the corresponding 3-propionates or 3-butyrates of 3β,14,21-trihydroxy-5β-card-20(22)-enolide, 3β,5β,14,21-tetrahydroxycard-20(22)-enolide and 19-oxo-3β,5β,14,21-tetrahydroxycard-20(22)-enolide, respectively.

In the same manner the 3β,19-dipropionate, and 3β,19-dibutyrate of 17β-[3'-furyl]-androstane-3β,5β,14β,19-tetrol, obtained in Example 35, yield the corresponding 3β,19-dipropionate, and 3β,19-dibutyrate of 3β,5β,14,19,21-pentahydroxycard-20(22)-enolide, respectively.

EXAMPLE 60

By the same procedure as described in Example 59, 17β-[3'-furyl]-5β-androstane-3β,14β-diol, 17β-[3'-furyl]-androstane-3β,5β,14β-triol, 17β-[3'-furyl]-androstane-3β,5β,14β,19-tetrol obtained in Example 32, and 17β-[3'-furyl]-3β,5β,14β-trihydroxyandrostan-19-al, obtained in Example 33 are treated with peracetic acid to yield, respectively, 3β,14,21-trihydroxy-5β-card-20(22)-enolide, 3β,5β,14,21-tetrahydroxycard-20(22)-enolide, 3β,5β,14,19,21-pentahydroxycard-20(22)-enolide, and 19-oxo-3β,5β,14,21-tetrahydroxycard-20(22)-enolide.

EXAMPLE 61

A solution of 3β-acetoxy-14,21-dihydroxy-5β-card-20-(22)-enolide (500 mg.), described in Example 59, pyridine (10 ml.), and acetic anhydride (5 ml.), is allowed to stand at room temperature overnight. Methanol (5 ml.) is added, and the solution is poured into ice-water and extracted with ether. The ether is washed with dilute sulfuric acid, sodium bicarbonate and water, dried and evaporated to dryness. The residue is crystallized from ether to yield 3β,21-diacetoxy-14-hydroxy-5β-card-20(22)-enolide, M.P. 190–191° C. Similarly, acetylation of 3β-acetoxy-5β,14,21-trihydroxycard-20(22)-enolide, 3β-acetoxy-19-oxo-5β,14,21-trihydroxycard-20(22)-enolide, and 3β,19-diacetoxy-5β,14,21-,trihydroxycard-20(22)-enolide, described in Example 59, yields 3β,21-diacetoxy-5β,14-dihydroxycard-20(22)-enolide, 3β,21-diacetoxy-5β,14-dihydroxy-19-oxo-card-20(22)-enolide, and 5β,14-dihydroxy-3β,19,21-triacetoxycard-20(22)-enolide, respectively.

In a similar manner, acetylation of the 3-propionates and 3-butyrates of 3β,14,21-trihydroxy-5β-card-20(22)-enolide, 3β,5β,14,21-tetrahydroxycard-20(22)-enolide, and 19-oxo-3β,5β,14,21-tetrahydroxycard-20(22)-enolide described in Example 59, yields the coresponding 21-acetates of the 3-propionates and 3-butyrates of 3β,14,21-trihydroxy-5β-card-20(22)-enolide, 3β,5β,14,21-tetrahydroxycard-20(22)-enolide, and 19-oxo-3β,5β,14,21-tetrahydroxycard-20(22)-enolide, respectively.

By a similar procedure, acylation with the appropiate lower aliphatic acid anhydrides or acyl chlorides such as, for example, propionic anhydride or butyryl chloride, in pyridine, of the 3-acylated derivatives of 3β,14,21-trihydroxy-5β-card-20(22)-enolide, 3β,5β,14,21-tetrahydroxycard-20(22)-enolide and 19-oxo-3β,5β,14,21-tetrahydroxycard-20(22)-enolide and the 3β,19-diacylates of 3β,5β,14,19,21-pentahydroxycard-20(22)-enolide obtained as described in Example 59, yields the corresponding mixed 3β,21-diacylates and the corresponding mixed 3β,19,21-triacylates, such as, for example, the 3β-acetate-21-propionate or the 3β-acetate-21-butyrate of 3β,14,21-trihydroxy-5β-card-20(22)-enolide, 3β,5β,14,21-tetrahydroxycard-20(22)-enolide, or 19-oxo-3β,5β,14,21-tetrahydroxycard-20(22)-enolide; or the 3β,19-diacetate-21-propionate or 3β,19-diacetate-21-butyrate of 3β,5β,14,19,-21-pentahydroxycard-20(22)-enolide.

EXAMPLE 62

Acylation with acetic anhydride, propionic anhydride, or butyryl chloride by the procedure of Example 61, of 3β,14,21-trihydroxy-5β-card-20(22)-enolide, 3β,5β,14,-21-tetrahydroxycard-20(22)-enolide, and 19-oxo-3β,5β,-14,21-tetrahydroxycard-20(22)-enolide obtained in Example 60 yields the corresponding 3β,21-diacetates, 3β,21-dipropionates, and 3β,21-dibutyrates of 3β,14,21-trihydroxy-5β-card-20(22)-enolide, 3β,5β,14,21-tetrahydroxycard-20(22)-enolide, and 19-oxo-3β,5β,14,21-tetrahydroxycard-20(22)-enolide, respectively.

Similarly, acylation as above, of 3β,5β,14,19,21-pentahydroxycard-20(22)-enolide described in Example 60, yields the corresponding 3β,19,21-triacetate, 3β,19,21-tripropionate, and 3β,19,21-tributyrate of 3β,5β,14,19,21-pentahydroxycard-20(22)-enolide, respectively.

We claim:
1. A compound selected from those of the formula

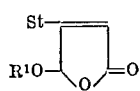

wherein St is a steroid radical selected from those of the formulae

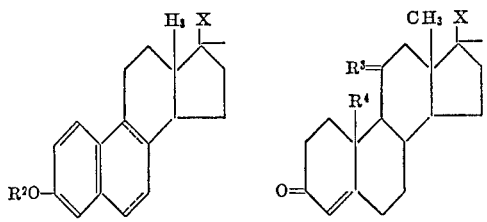

and

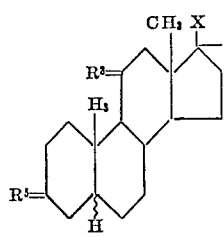

joined to the lactone ring at the 17-position of said steroid radical, and $R^1$ is selected from the group which consists of hydrogen and lower aliphatic acyl; X represents hydrogen, hydroxyl, or lower aliphatic acyloxy; $R^2$ represents hydrogen, a lower alkyl group containing from one to four carbon atoms, a cycloalkyl group containing from five to six carbon atoms or acyl; $R^3$ represents two atoms of hydrogen, a hydroxyl group and a hydrogen atom, or an oxygen atom; $R^4$ represents hydrogen or methyl; and $R^5$ represents hydroxyl, a lower aliphatic acyloxy group and a hydrogen atom, or an oxygen atom, the dotted lines in ring B of said formula containing said dotted lines as appearing above indicating that two double bonds in positions 6,7 and 8,9 may be present.

2. 4,4 - dihydroxy - 3 - [17′β - hydroxy - 3′ - methoxy-1′,3′,5′(10′)-estratrien-17′-yl]-2-butenoic acid lactone, as claimed in claim 1.

3. 4,4 - dihydroxy - 3 - [3′ - methoxy - 1′,3′,5′(10′)-estratrien-17′β-yl]-2-butenoic acid lactone, as claimed in claim 1.

4. 4,4 - dihydroxy - 3 - [17′β - hydroxy - 3′ - oxo - 4′-androsten-17′-yl]-2-butenoic acid lactone, as claimed in claim 1.

5. 4,4 - dihydroxy - 3 - [3′,11′ - dioxo - 17′β - hydroxy-4′-androsten-17′-yl]-2-butenoic acid lactone, as claimed in claim 1.

6. 4,4 - dihydroxy - 3 - [11′β,17′β - dihydroxy - 3′ - oxo-4′-androsten-17′-yl]-2-butenoic acid lactone, as claimed in claim 1.

7. 4,4 - dihydroxy - 3 - [17′β - hydroxy - 3′ - oxo - 4′-estren-17′-yl]-2-butenoic acid lactone, as claimed in claim 1.

8. 4,4 - dihydroxy - 3 - [3′,11′ - dioxo - 17′β - hydroxy-4′-estren-17′-yl]-2-butenoic acid lactone, as claimed in claim 1.

9. 4,4 - dihydroxy - 3 - [11′β,17′β - dihydroxy - 3′-oxo-4′-estren-17′-yl]-2-butenoic acid lactone, as claimed in claim 1.

10. 4,4 - dihydroxy - 3 - [3′ - oxo - 4′ - androsten - 17′β-yl]-2-butenoic acid lactone, as claimed in claim 1.

11. 4,4 - dihydroxy - 3 - [3′,11′ - dioxo - 4′ - androsten-17′β-yl]-2-butenoic acid lactone, as claimed in claim 1.

12. 4,4 - dihydroxy - 3 - [11′β-hydroxy - 3′ - oxo - 4′-androsten-17′β-yl]-2-butenoic acid lactone, as claimed in claim 1.

13. 4,4 - dihydroxy - 3 - [3′ - oxo - 4′ - estren - 17′β-yl]-2-butenoic acid lactone, as claimed in claim 1.

14. 4,4 - dihydroxy - 3 - [3′,11′ - dioxo - 4′ - estren-17′β-yl]-2-butenoic acid lactone, as claimed in claim 1.

15. 4,4 - dihydroxy - 3 - [17′β - hydroxy - 3′ - oxo - 5′β-androstan-17′-yl]-2-butenoic acid lactone, as claimed in claim 1.

16. 4,4 - dihydroxy - 3 - [3′,11′ - dioxo - 17′β - hydroxy-5′β-androstan-17′-yl]-2-butenoic acid lactone, as claimed in claim 1.

17. 4,4 - dihydroxy - 3 - [11′β,17′β - dihydroxy - 3′-oxo-5′β-androstan-17′-yl]-2-butenoic acid lactone, as claimed in claim 1.

18. 3β,14,21-trihydroxy-5β-card-20(22)-enolide.
19. 3β,5β,14,21-tetrahydroxycard-20(22)-enolide.
20. 3β,5β,14,19,21-pentahydroxycard-20(22)-enolide.
21. 19 - oxo - 3β,5β,14,21 - tetrahydroxycard- 20(22)-enolide.
22. 3β - acetoxy - 14,21 - dihydroxy - 5β - card - 20(22)-enolide.
23. 3β - acetoxy - 5β,14,21 - trihydroxycard - 20(22)-enolide.
24. 3β - acetoxy - 19 - oxo - 5β,14,21 - trihydroxycard-20(22)-enolide.
25. The process which comprises subjecting a 17-[3′-furyl]-substituted steroid of the formula

in which St represents a steroid radical selected from the group which consists of

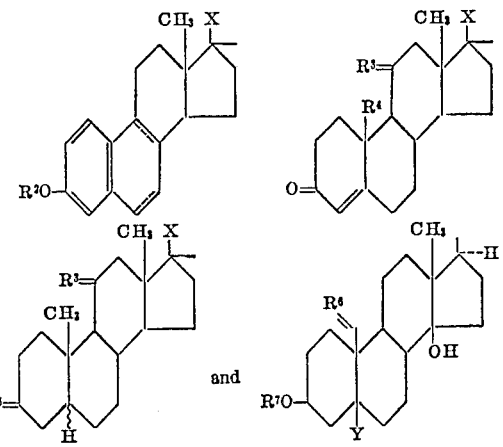

wherein X represents hydrogen, hydroxyl or lower aliphatic acyloxy; $R^2$ represents hydrogen, a lower alkyl group containing from one to four carbon atoms, a cycloalkyl group containing from five to six carbon atoms or acyl; $R^3$ represents two atoms of hydrogen, a hydroxyl group and a hydrogen atom, or an oxygen atom; $R^4$ represents hydrogen or methyl; $R^5$ represents hydroxy or a lower aliphatic acyloxy group and a hydrogen atom, or an oxygen atom; $R^6$ represents two atoms of hydrogen, hydroxyl, a lower aliphatic acyloxy group and one atom of hydrogen, or an oxygen atom; $R^7$ represents hydrogen or a lower aliphatic acyl group; and Y represents hydrogen or hydroxyl, the dotted lines in ring B of said formula containing said dotted lines as appearing above indicating that two double bonds in positions 6,7 and 8,9 may be present, to the action of an organic peracid selected from the group which consists of peracetic, perbenzoic, monoperphthalic, m-chloroperbenzoic acid and p-nitroperbenzoic acid in the presence of a nucleophilic reagent selected from the group which consists of acetic acid and water, thereby securing a compound of the formula

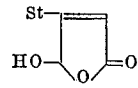

wherein St is as above defined.

References Cited

UNITED STATES PATENTS 2,951,076   8/1960   Pappo _____ 260—239.57

OTHER REFERENCES

Satoh et al.: Annalen der Chemie 685, pp. 246–253, p. 248 relied on (June 1965).

Catala et al.: C.A., vol. 61, col. 1732d (1964).

HENRY A. FRENCH, *Primary Examiner.*

U.S. Cl. X.R.

260—239.5, 239.55, 397.4, 397.45; 424—241

UNITED STATES PATENT OFFICE
CERTIFICATE OF CORRECTION

Patent No. 3,436,390              April 1, 1969

Yvon Lefebvre et al.

It is certified that error appears in the above identified patent and that said Letters Patent are hereby corrected as shown below:

Column 5, formula XI should appear as shown below:

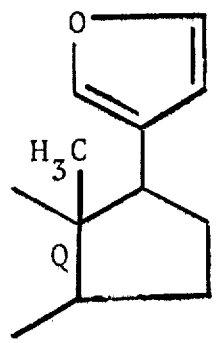

Signed and sealed this 7th day of April 1970.

(SEAL)
Attest:

EDWARD M. FLETCHER, JR.            WILLIAM E. SCHUYLER, JR.
Attesting Officer                     Commissioner of Patents